United States Patent
Yamazaki et al.

(10) Patent No.: US 12,417,640 B2
(45) Date of Patent: Sep. 16, 2025

(54) SURVEILLANCE SYSTEM, SURVEILLANCE APPARATUS, SURVEILLANCE METHOD, AND NON-TRANSITORY COMPUTER-READABLE STORAGE MEDIUM

(71) Applicant: NEC Corporation, Tokyo (JP)

(72) Inventors: Daiki Yamazaki, Tokyo (JP); Ryuji Wakakusa, Tokyo (JP)

(73) Assignee: NEC CORPORATION, Tokyo (JP)

( * ) Notice: Subject to any disclaimer, the term of this patent is extended or adjusted under 35 U.S.C. 154(b) by 476 days.

(21) Appl. No.: 17/790,911

(22) PCT Filed: Apr. 13, 2020

(86) PCT No.: PCT/JP2020/016315
§ 371 (c)(1),
(2) Date: Jul. 5, 2022

(87) PCT Pub. No.: WO2021/149274
PCT Pub. Date: Jul. 29, 2021

(65) Prior Publication Data
US 2023/0083156 A1    Mar. 16, 2023

(30) Foreign Application Priority Data

Jan. 20, 2020  (WO) .................. PCT/JP2020/001760

(51) Int. Cl.
*G06V 20/54*    (2022.01)
*G06T 7/20*    (2017.01)
(Continued)

(52) U.S. Cl.
CPC ............... *G06V 20/54* (2022.01); *G06T 7/20* (2013.01); *G06T 7/70* (2017.01); *G06V 40/10* (2022.01);
(Continued)

(58) Field of Classification Search
CPC . G06T 2207/30242; G06T 2207/30261; G06T 7/20; G06T 7/215; G06T 7/246;
(Continued)

(56) References Cited

U.S. PATENT DOCUMENTS

| | | | |
|---|---|---|---|
| 10,572,737 B2 | 2/2020 | Leizerovich et al. | |
| 2014/0192194 A1* | 7/2014 | Bedell | H04N 7/183 |
| | | | 348/148 |

(Continued)

FOREIGN PATENT DOCUMENTS

| | | | |
|---|---|---|---|
| JP | 2007-195130 A | 8/2007 | |
| JP | 2007-251556 A | 9/2007 | |

(Continued)

OTHER PUBLICATIONS

JP Office Action for JP Application No. 2023-175000, mailed on Oct. 1, 2024 with English Translation.

(Continued)

*Primary Examiner* — Gregory A Morse
*Assistant Examiner* — Stefano Anthony Dardano
(74) *Attorney, Agent, or Firm* — Sughrue Mion, PLLC

(57) ABSTRACT

A surveillance apparatus (100) includes a detection unit (102) processing an image in which an area around a road is captured and detecting that the relative distance between a person and a vehicle included in the image is in a state of being equal to or less than a reference value, and an output unit (104) selecting a type of information to be output, by using an attribute of the person detected to be in the state, and outputting information of the selected type.

18 Claims, 21 Drawing Sheets

(51) Int. Cl.
*G06T 7/70* (2017.01)
*G06V 40/10* (2022.01)

(52) U.S. Cl.
CPC ............... *G06T 2207/30196* (2013.01); *G06T 2207/30232* (2013.01); *G06T 2207/30236* (2013.01); *G06T 2207/30242* (2013.01); *G06V 2201/08* (2022.01)

(58) Field of Classification Search
CPC ........... G06T 7/292; G06T 7/579; G06T 7/70; G06T 2207/10016; G06T 2207/30196; G06T 2207/30232; G06T 2207/30236; G06V 2201/08; G06V 40/103; G06V 40/00–20; G06V 20/44; G06V 2201/07; G06V 20/58; G06V 40/10; G06V 20/52–54; H04N 21/23418; H04N 7/188; H04N 7/18; H04N 7/181; G08B 13/00–19697
See application file for complete search history.

(56) References Cited

U.S. PATENT DOCUMENTS

| | | | |
|---|---|---|---|
| 2016/0096506 A1* | 4/2016 | Shreve | B60R 25/102 348/148 |
| 2016/0140872 A1* | 5/2016 | Palmer | G09B 19/167 434/65 |
| 2017/0313247 A1* | 11/2017 | Hsu | G08G 1/165 |
| 2017/0357855 A1 | 12/2017 | Kusumoto | |
| 2018/0090010 A1 | 3/2018 | Ikehara et al. | |
| 2018/0272992 A1* | 9/2018 | Gage | G06V 20/56 |
| 2019/0347914 A1 | 11/2019 | Kinoshita et al. | |
| 2019/0354773 A1* | 11/2019 | Leizerovich | G08B 25/016 |

FOREIGN PATENT DOCUMENTS

| | | |
|---|---|---|
| JP | 2012-059023 A | 3/2012 |
| JP | 2017-220151 A | 12/2017 |
| JP | 2018-054498 A | 4/2018 |
| WO | 2018/110165 A1 | 6/2018 |

OTHER PUBLICATIONS

International Search Report for PCT Application No. PCT/JP2020/016315, mailed on Jun. 30, 2020.

* cited by examiner

SURVEILLANCE SYSTEM, SURVEILLANCE APPARATUS, SURVEILLANCE METHOD, AND NON-TRANSITORY COMPUTER-READABLE STORAGE MEDIUM

This application is a National Stage Entry of PCT/JP2020/016315 filed on Apr. 13, 2020, which claims priority from International Application No. PCT/JP2020/001760, filed on Jan. 20, 2020, the contents of all of which are incorporated herein by reference, in their entirety.

TECHNICAL FIELD

The present invention relates to a surveillance system, a surveillance apparatus, a surveillance method, and a program.

BACKGROUND ART

Installation of surveillance cameras in towns has been under way in recent years and is utilized in crime prevention. Patent Document 1 describes a video surveillance system detecting an act of trespassing on a parking lot or the like by analyzing a video from a security camera and, at the same time, immediately transmitting a warning and the video being the basis of the determination to a display apparatus in a surveillance room where a surveillant stands by, or mobile phones or the like carried by a guard and a person concerned.

RELATED DOCUMENT

Patent Document

Patent Document 1: Japanese Patent Application Publication No. 2007-195130

DISCLOSURE OF THE INVENTION

Technical Problem

However, the aforementioned document does not disclose a technology for detecting criminal acts committed against a pedestrian and a vehicle, such as kidnapping and vehicle theft.

The present invention has been made in view of the aforementioned circumstances, and an object of the present invention is to provide a technology for detecting situations in which criminal acts committed against a pedestrian and a vehicle may occur.

Solution to Problem

In order to solve the aforementioned problem, aspects of the present invention employ the following configurations, respectively.

A first aspect relates to a surveillance system.

A surveillance system according to the first aspect includes:

a plurality of cameras each capturing an image of an area around a road; and a surveillance apparatus surveilling images captured by a plurality of cameras, wherein the surveillance apparatus includes:

a detection unit that processes an image in which an area around a road is captured and detects that a relative distance between a person and a vehicle included in the image is in a state of being equal to or less than a reference value; and an output unit that outputs a type of information to be output, the type of information being selected by using an attribute of the person detected to be in the state.

A second aspect relates to a surveillance apparatus.

A surveillance apparatus according to the second aspect includes:

a detection unit that processes an image in which an area around a road is captured and detects that a relative distance between a person and a vehicle included in the image is in a state of being equal to or less than a reference value; and an output unit that outputs a type of information to be output, the type of information being selected by using an attribute of the person detected to be in the state.

A third aspect relates to a surveillance method executed by at least one computer.

A surveillance method according to the third aspect includes, by a surveillance apparatus:

processing an image in which an area around a road is captured and detecting that a relative distance between a person and a vehicle included in the image is in a state of being equal to or less than a reference value; and outputting a type of information to be output, the type of information being selected by using an attribute of the person detected to be in the state.

Note that another aspect of the present invention may be a program causing at least one computer to execute the method according to the aforementioned third aspect or a computer-readable storage medium on which such a program is recorded. The storage medium includes a non-transitory tangible medium.

The computer program includes a computer program code causing a computer to implement the surveillance method on the surveillance apparatus when being executed by the computer.

Note that any combination of the components described above and representation of the present invention converted among a method, an apparatus, a system, a storage medium, a computer program, and the like are also valid as embodiments of the present invention.

Further, various components of the present invention do not necessarily need to be individually independent, and, for example, a plurality of components may be formed as a single member, a plurality of members may form a single component, a certain component may be part of another component, and part of a certain component may overlap with part of another component.

Further, while a plurality of procedures are described in a sequential order in the method and the computer program according to the present invention, the order of description does not limit the order in which the plurality of procedures are executed. Therefore, when the method and the computer program according to the present invention are implemented, the order of the plurality of procedures may be changed without affecting the contents.

Furthermore, a plurality of procedures in the method and the computer program according to the present invention are not limited to being individually executed at different timings. Thus, another procedure may occur during execution of any procedure, and an execution timing of any procedure may partially or entirely overlap an execution timing of another procedure.

Advantageous Effects of Invention

The aforementioned aspects can provide a technology for detecting a situation in which a criminal act committed against a pedestrian may occur.

DESCRIPTION OF EMBODIMENTS

Example embodiments of the present invention are described below by using drawings. Note that, in every drawing, similar components are given similar signs, and description thereof is omitted as appropriate.

In the example embodiments, "acquisition" includes at least either of an apparatus getting data or information stored in another apparatus or a storage medium (active acquisition), and an apparatus inputting data or information output from another apparatus to the apparatus (passive acquisition). Examples of the active acquisition include making a request or an inquiry to another apparatus and receiving a response and readout by accessing another apparatus or a storage medium. Further, examples of the passive acquisition include reception of distributed (or, for example, transmitted or push notified) information. Furthermore, "acquisition" may refer to acquisition by selection from received data or information, or selective reception of distributed data or information.

First Example Embodiment

<System Overview>

Figure 1:
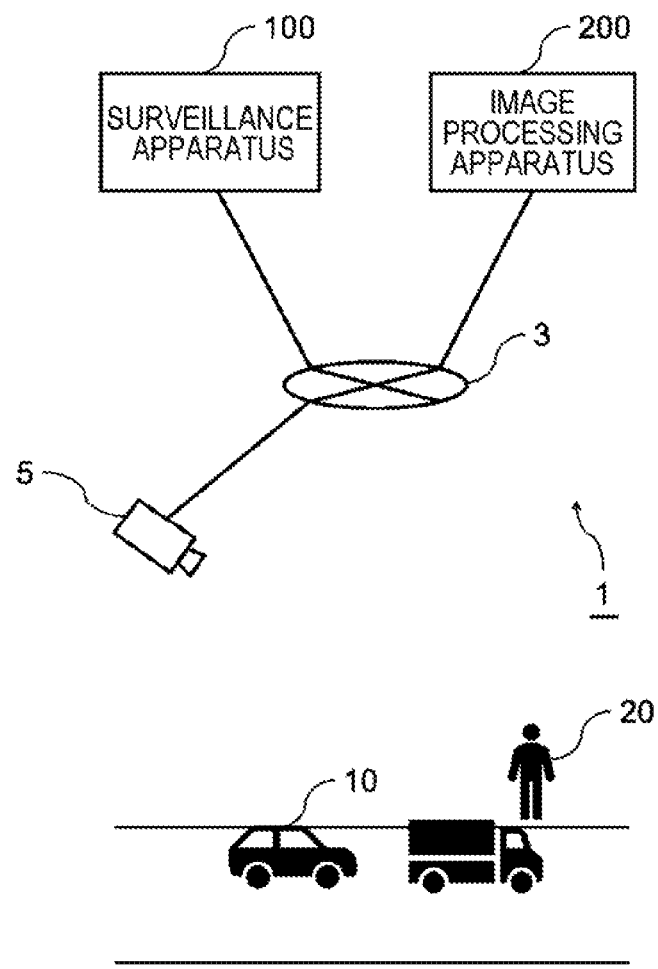
FIG. 1 is a diagram schematically illustrating an overview of a surveillance system according to an example embodiment.

FIG. 1 is a diagram schematically illustrating an overview of a surveillance system 1 according to an example embodiment. The surveillance system 1 is a system in which an image processing apparatus 200 recognizes a vehicle 10 and a person 20 by processing an image captured by a surveillance camera 5 installed in a town, and a surveillance apparatus 100 detects criminal acts such as kidnapping and vehicle theft by using the processing result by the image processing apparatus 200.

The surveillance system 1 includes the surveillance apparatus 100, the image processing apparatus 200, and at least one surveillance camera 5. As the surveillance camera 5, a camera dedicated to the surveillance system 1 may be used, or, for example, a previously installed camera may be used.

The surveillance camera 5 captures an image of a surveilled location and generates an image. The surveillance camera 5 includes imaging elements such as a lens and a charge coupled device (CCD) image sensor. The surveillance camera 5 may include a mechanism for performing direction control of the main body of the camera and the lens, zooming control, focusing, and the like following movement of a person entering the angle of view.

The surveillance camera 5 captures an image of an area including at least a road passable by a vehicle 10. For example, the surveillance camera 5 captures an image of an area including a road with a width wider than that of a vehicle 10. Further, the surveillance camera 5 may capture an image of an area including roads constituted of a sidewalk on which a person 20 passes and a roadway on which a vehicle 10 passes. However, without being limited to roads, the surveillance camera 5 may capture an image of a location where a vehicle 10 and a person 20 can enter, such as a parking lot. Note that the surveillance camera 5 may capture an image of a moving person 20 or a stationary person 20. The surveillance camera 5 may capture an image of a moving vehicle 10 or a stationary vehicle 10.

The surveillance camera 5 may capture an image of an area including locations where crimes are likely to occur such as a location behind a structure such as shrubbery, a fence, or a building, an empty location, and a location where crimes have occurred repeatedly in the past.

An image generated by the surveillance camera 5 is preferably transmitted to the surveillance apparatus 100 in real time. However, an image transmitted to the surveillance apparatus 100 may not be immediately transmitted from the surveillance camera 5 and may be an image delayed by a predetermined time. Images generated by the surveillance camera 5 may be temporarily stored in a separate storage apparatus and be read from the storage apparatus by the surveillance apparatus 100 sequentially or at predetermined intervals. Furthermore, images transmitted to the surveillance apparatus 100 are preferably dynamic images but may be frame images captured at a predetermined intervals or static images.

A method of connecting the surveillance camera 5 to the surveillance apparatus 100 may be wireless or wired. In the case of a wireless connection, it is assumed that each of the surveillance camera 5 and the surveillance apparatus 100 has a wireless communication function. For example, the surveillance camera 5 may be a network camera such as an Internet Protocol (IP) camera.

<Functional Configuration Example>

Figure 2:
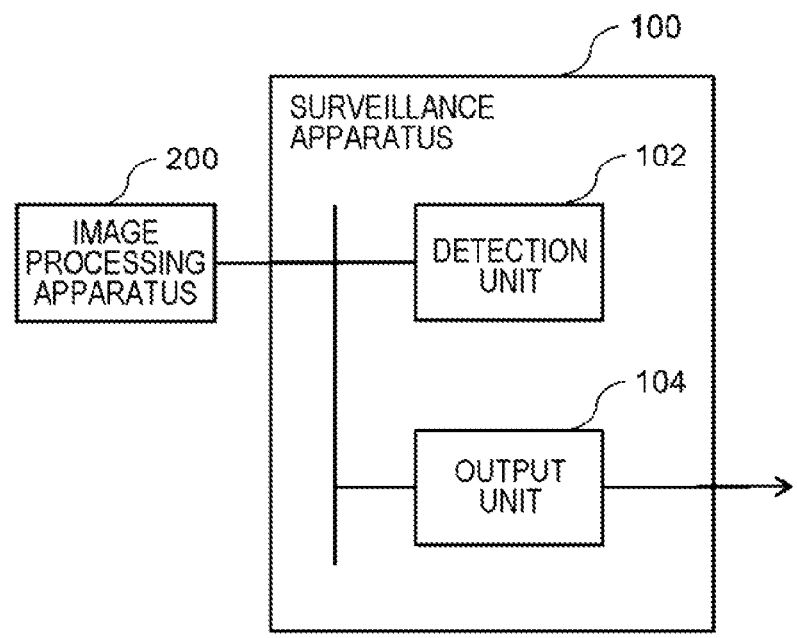
FIG. 2 is a functional block diagram illustrating a logical configuration example of a surveillance apparatus in FIG. 1.

FIG. 2 is a functional block diagram illustrating a logical configuration example of the surveillance apparatus 100 in FIG. 1. The surveillance apparatus 100 includes a detection unit 102 and an output unit 104. The detection unit 102 detects that the relative distance between a person 20 and a vehicle 10 included in an image is in a state of being equal to or less than a reference value (hereinafter also referred to as an approaching state). The output unit 104 outputs a type of information to be output selected by using an attribute of a person 20 detected to be in the approaching state.

The state of the relative distance between a person 20 and a vehicle 10 being equal to or less than the reference value refers to a state of the distance between the person 20 and the vehicle 10 being equal to or less than the reference value. The state of the relative distance between a person 20 and a vehicle 10 being equal to or less than the reference value may refer to a state of the relative distance gradually shortening and eventually becoming equal to or less than the reference value by at least either one of the person 20 and the vehicle 10 moving, that is, a state of the person 20 and the vehicle 10 approaching each other with time. The detection unit 102 may detect a state of the person 20 moving and approaching the vehicle 10 or may detect a state of the vehicle 10 moving and approaching the person 20. The detection unit 102 may detect a state of both the person 20 and the vehicle 10 moving and the vehicle 10 approaching the moving person 20 from behind. The detection unit 102 may detect a state of the vehicle 10 approaching the moving person 20 from in front of the person 20.

For example, with regard to a change in the relative distance between a person 20 and a vehicle 10, the image processing apparatus 200 can detect, in a plurality of time-series images, the positions of a feature part of each of the person 20 and the vehicle 10 determined in an image and estimate moving directions of the person 20 and the vehicle 10 and the relative distance between the person 20 and the vehicle 10 from changes in the positions of the person 20 and the vehicle 10 and a relative positional relation between the two. The detection unit 102 detects a state of the relative distance between the person 20 and the vehicle 10 included in the image being equal to or less than the reference value, based on the processing result by the image processing apparatus 200.

An attribute of a person 20 is set based on at least one of attributes extracted from an image, such as gender, age, a feature of the face, height, belongings, clothing, and a situation.

Examples of a type of information to be output include information about a type of crime such as a possibility of occurrence of kidnapping and a possibility of occurrence of vehicle theft. An output destination and an output method may vary by the type of information to be output.

Examples of various output destinations that may be considered include a monitor screen for surveillance on a display apparatus at a surveillance center, a terminal (unillustrated) carried by a guard or the like, and a monitor screen for surveillance on a display apparatus (unillustrated) at a police station. Output methods include at least one method out of display on a monitor screen, transmission of an email, and output of a voice or a warning sound from a speaker (unillustrated). At least one of an email address, an IP address of a mobile terminal, and a mobile phone number may be preregistered as an output destination.

As for an output content, a video from a surveillance camera 5 for which notification is to be given may be output along with information indicating a selected type of information. In a case of a surveillance center, a video from a surveillance camera 5 for which notification is to be given may be highlighted in a state of videos of a plurality of surveillance cameras 5 being multi-displayed. For example, multi-display of videos may be switched to single-screen display of only a video from a surveillance camera 5 for which notification is to be given or display of an enlarged view of the video. Alternatively, a border of a relevant screen in multi-display may be highlighted, or an image to be highlighted may be displayed by superimposition.

In addition to a video from the surveillance camera 5, a static image of an image captured by the surveillance camera 5, an image (such as an icon or an animation) indicating the type of output information, text information indicating the type of output information, information notifying occurrence of a crime may be displayed. Alternatively, a warning sound based on the type of output information or a voice indicating the type of output information may be output from a speaker at the surveillance center.

Hardware Configuration Example

Figure 3:
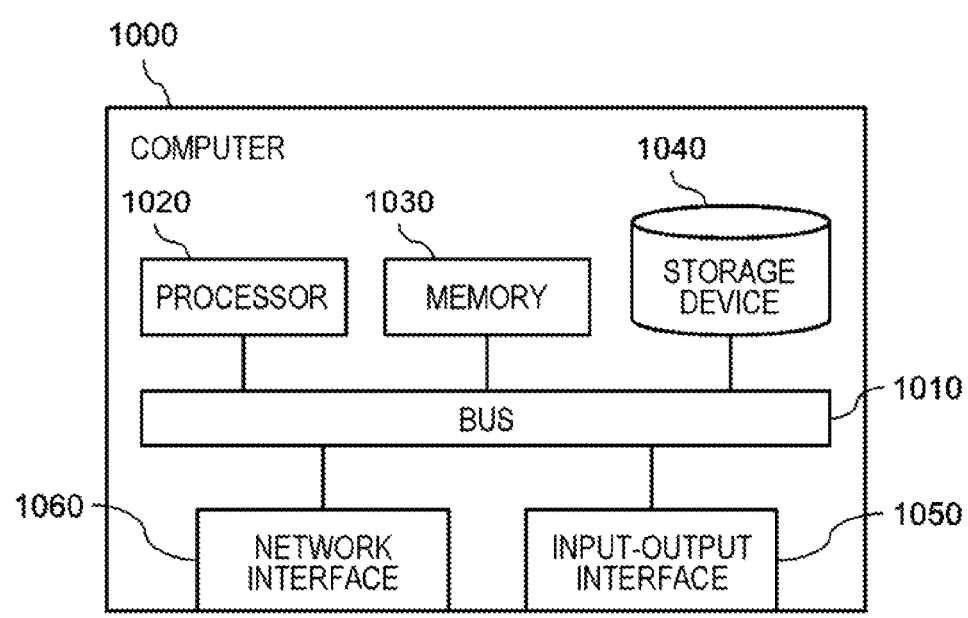
FIG. 3 is a block diagram illustrating a hardware configuration of a computer providing each of the surveillance apparatus and an image processing apparatus in the surveillance system illustrated in FIG. 1.

FIG. 3 is a block diagram illustrating a hardware configuration of a computer 1000 providing each of the surveillance apparatus 100 and the image processing apparatus 200 in the surveillance system 1 illustrated in FIG. 1.

The computer 1000 includes a bus 1010, a processor 1020, a memory 1030, a storage device 1040, an input-output interface 1050, and a network interface 1060.

The bus 1010 is a data transmission channel for the processor 1020, the memory 1030, the storage device 1040, the input-output interface 1050, and the network interface 1060 to transmit and receive data to and from one another. Note that the method of interconnecting the processor 1020 and other components is not limited to a bus connection.

The processor 1020 is a processor provided by a central processing unit (CPU), a graphics processing unit (GPU), or the like.

The memory 1030 is a main storage provided by a random access memory (RAM) or the like.

The storage device 1040 is an auxiliary storage provided by a hard disk drive (HDD), a solid state drive (SSD), a memory card, a read only memory (ROM), or the like. The storage device 1040 stores program modules implementing the functions of the surveillance apparatus 100 in the surveillance system 1 (such as the detection unit 102 and the output unit 104). By reading each program module into the memory 1030 and executing the program module by the processor 1020, each function related to the program module is implemented. Further, the storage device 1040 also functions as a storage unit storing various types of information used by the surveillance apparatus 100.

A program module may be recorded in a storage medium. Storage media recording program modules may include a non-transitory tangible medium usable by the computer 1000, and a program code readable by the computer 1000 (processor 1020) may be embedded in the medium.

The input-output interface 1050 is an interface for connecting the computer 1000 to various types of input-output equipment.

The network interface 1060 is an interface for connecting the computer 1000 to a communication network 3. Examples of the communication network 3 include a local area network (LAN) and a wide area network (WAN). The method of connecting the network interface 1060 to the communication network 3 may be a wireless connection or a wired connection. Note that the network interface 1060 may not be used.

Then, the computer 1000 is connected to required equipment [such as the surveillance camera 5, a display (unillustrated), and a speaker (unillustrated)] through the input-output interface 1050 or the network interface 1060.

The surveillance system 1 is provided by a combination of the surveillance apparatus 100 and the image processing apparatus 200 and therefore is provided by a plurality of computers 1000 constituting the apparatuses, respectively. For example, the surveillance apparatus 100 is a server computer. The image processing apparatus 200 may be an apparatus separate from the surveillance apparatus 100, an apparatus included in the surveillance apparatus 100, or a combination of the two.

Each component in the surveillance apparatus 100 according to the present example embodiment in FIG. 2 is implemented by any combination of hardware and software in the computer 1000 in FIG. 3. Then, it should be understood by a person skilled in the art that various modifications to the implementation method and the apparatus can be made. A block diagram illustrating the surveillance apparatus 100 according to each example embodiment illustrates a logical function-based block rather than a hardware-based configuration.

<Operation Example>

Figure 4:
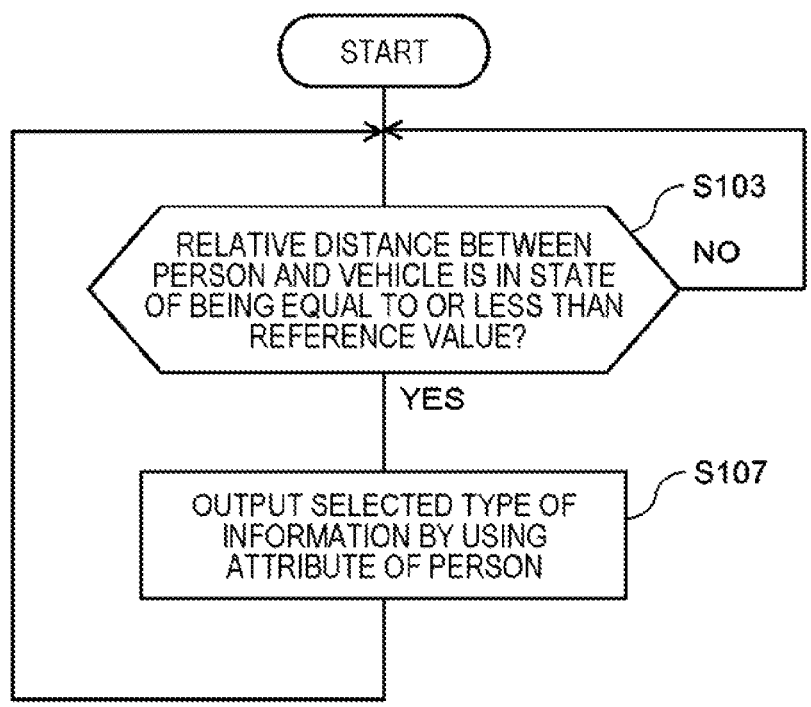
FIG. 4 is a flowchart illustrating an operation example of the surveillance apparatus according to the present example embodiment.

FIG. 4 is a flowchart illustrating an operation example of the surveillance apparatus 100 according to the present example embodiment. Based on a processing result of a captured image of an area around a road, the detection unit 102 detects that the relative distance between a person 20 and a vehicle 10 included in the image is in a state of being equal to or less than the reference value (Step S103), and the output unit 104 outputs information of a type selected by using an attribute of the person (Step S107).

According to the present example embodiment, the detection unit 102 detects a person 20 and a vehicle 10 in the approaching state, and the output unit 104 outputs information selected based on an attribute of the person 20. Thus, a situation in which a criminal act committed against a pedestrian or a vehicle, such as kidnapping or vehicle theft, may occur can be detected by using an image from the surveillance camera 5 capturing an image of an area around a road.

Second Example Embodiment

<Functional Configuration Example>

Figure 5:
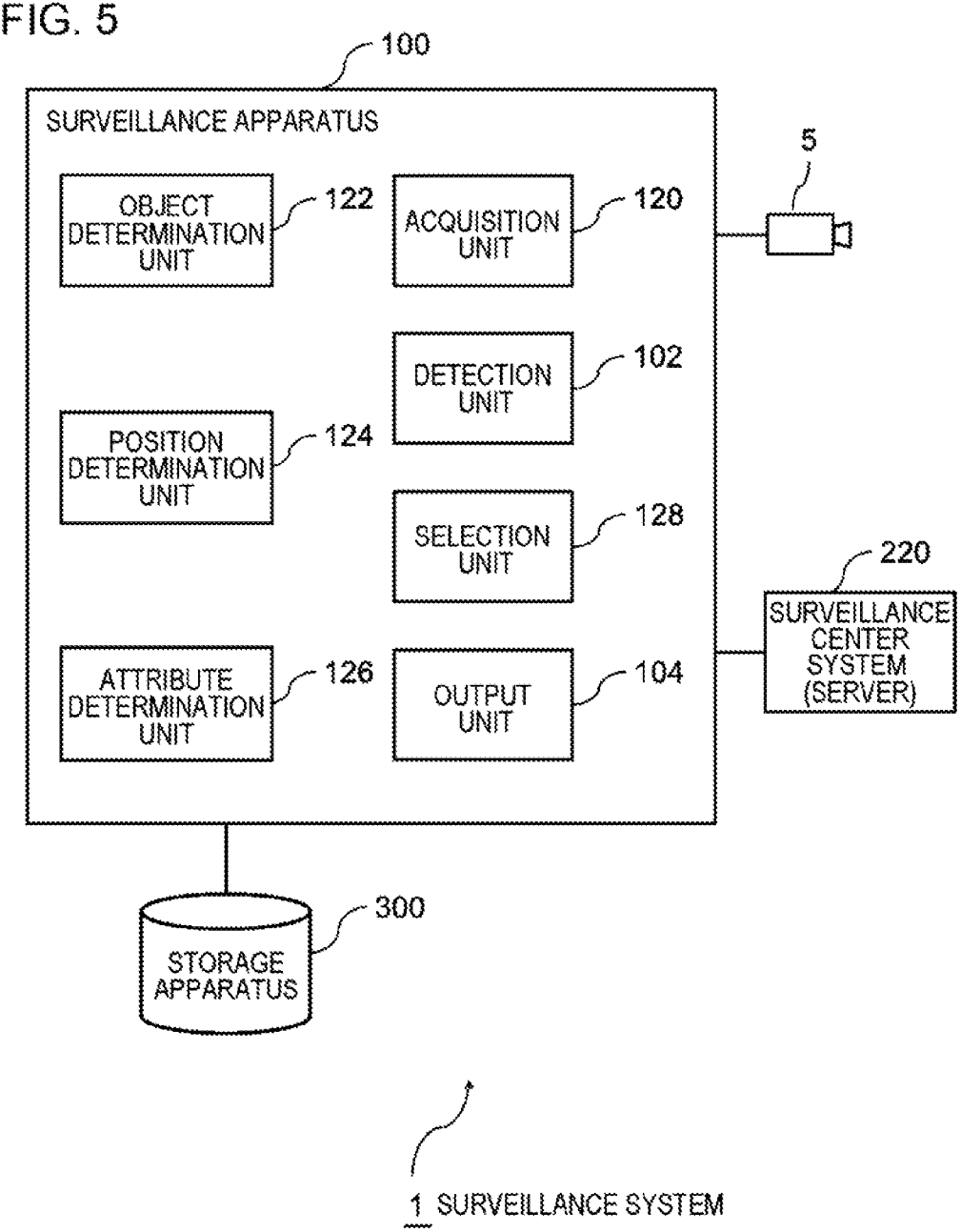
FIG. 5 is a functional block diagram illustrating a logical configuration example of a surveillance system.

FIG. 5 is a functional block diagram illustrating a logical configuration example of the surveillance system in FIG. 1. Note that while the image processing apparatus 200 is provided separately from the surveillance apparatus 100, according to the first example embodiment, the present example embodiment is described under the assumption that a surveillance apparatus 100 also has a function of an image processing apparatus 200. Note that it goes without saying that the surveillance apparatus 100 and the image processing apparatus 200 may be hardware-wise separate or the same.

A surveillance system 1 includes the surveillance apparatus 100, a storage apparatus 300, and a surveillance camera 5.

The surveillance apparatus 100 outputs information used for surveillance, based on an image generated by the surveillance camera 5.

The storage apparatus 300 stores data required for performing image processing. For example, the storage apparatus 300 stores information about a feature value for identifying a vehicle 10 or a person 20, and information about a feature value used for determining an attribute of a person.

The surveillance apparatus 100 includes an acquisition unit 120, an object determination unit 122, a position determination unit 124, an attribute determination unit 126, a detection unit 102, a selection unit 128, and an output unit 104.

The acquisition unit 120 acquires an image generated by the surveillance camera 5.

The object determination unit 122 determines an object by performing image processing on an image acquired by the acquisition unit 120. The object determination unit 122 recognizes and determines a person 20 and a vehicle 10.

By image processing, the position determination unit 124 determines the positions of a person 20 and a vehicle 10 determined by the object determination unit 122.

By image processing, the attribute determination unit 126 determines an attribute of a person 20 determined by the object determination unit 122. The attribute determination unit 126 determines whether the person 20 possesses a first attribute or a second attribute.

The first attribute is an attribute being highly likely to lead to a victim of a crime. Examples of the first attribute include "female," "male," "child (for example, an estimated age being X years old or younger)," "aged person (for example, an estimated age being Y years old or older)," "girl (such as a female whose estimated age is X years old or younger)," "boy (such as a male whose estimated age is X years old or younger)," "tourist (such as a person carrying a suitcase)", and "independent action (for example, no other person existing within a predetermined distance)." The first attribute is set based on features extracted from an image, such as gender, age, a feature of the face, height, belongings, clothing, and a situation (where X and Y are integers).

The second attribute is an attribute different from the first attribute. The second attribute includes an attribute having a feature leading to a perpetrator of a criminal act and an attribute of a person other than a person possessing the first attribute, that is, an attribute other than an attribute being highly likely to lead to a victim of a criminal act.

For example, the second attribute may include a person carrying a dangerous object (for example, carrying a long metal bar) and a person covering the face (such as a person wearing a mask). The second attribute is also set based on features extracted from an image, such as gender, age, a feature of the face, height, belongings, clothing, and a situation, similarly to the first attribute.

Note that a person satisfying the first attribute has only to possess an attribute being highly likely to lead to a victim of a crime, and therefore the first attribute is settable according to a criminal situation in a region. For example, "male" may be set to the first attribute in a region where "male" frequently becomes a victim of a crime, and "female" may be set to the first attribute in a region where "female" frequently becomes a victim of a crime.

The detection unit 102 acquires an attribute related to a person 20 determined by the object determination unit 122 and the positions of the person 20 and a vehicle 10.

For each pair of a person 20 and a vehicle 10 included in an image, the detection unit 102 determines whether the relative distance is in a state of being equal to or less than a reference value, that is, an approaching state, based on the positions.

When the detection unit 102 detects a person 20 and a vehicle 10 in the approaching state, the selection unit 128 acquires an attribute of the person 20 in the approaching state. The selection unit 128 selects a type of information to be output, by using the attribute of the detected person 20.

The output unit 104 outputs information of the type selected by the selection unit 128.

<Operation Example>

Figure 6:
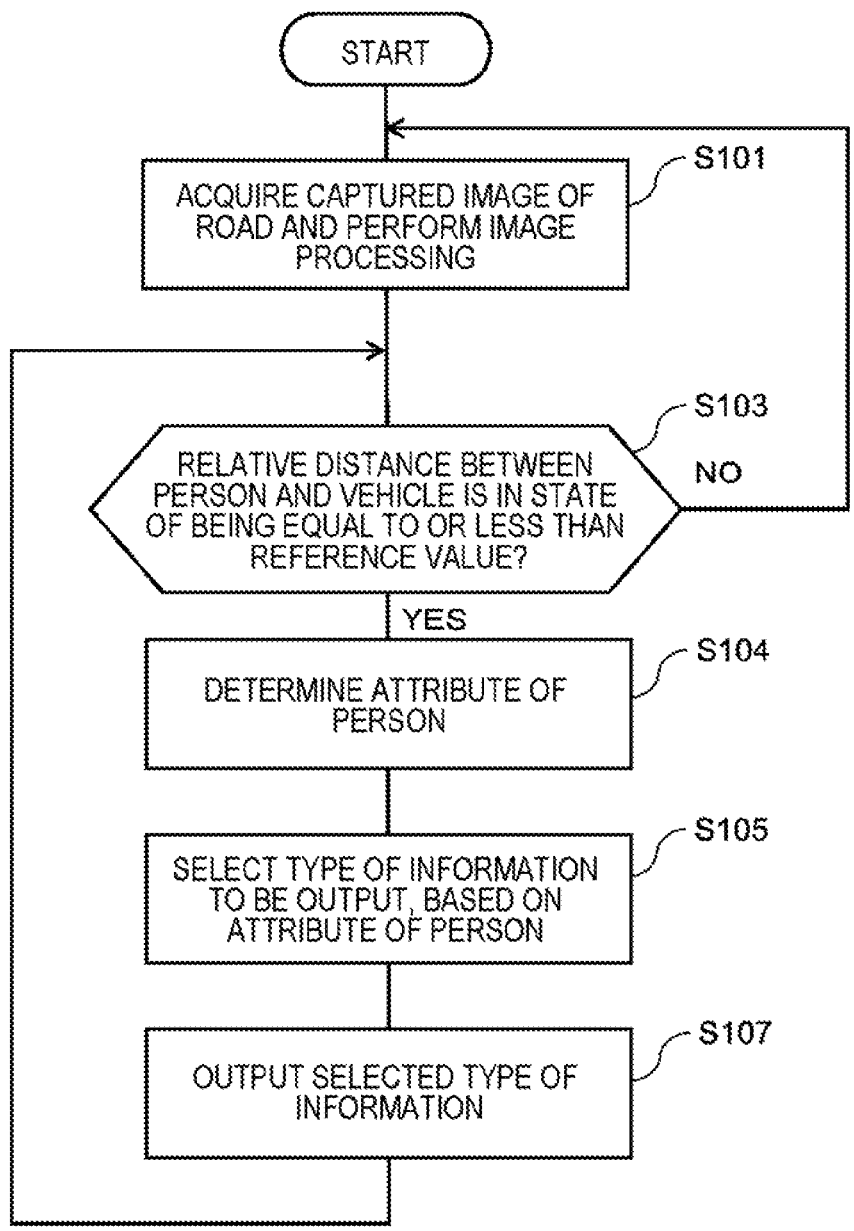
FIG. 6 is a flowchart illustrating an example of operation of the surveillance system.

FIG. 6 is a flowchart illustrating an operation example of the surveillance system 1 according to the present example embodiment.

The surveillance apparatus 100 acquires an image captured by the surveillance camera 5 and performs image processing (Step S101). Specifically, the object determination unit 122 recognizes and determines a person 20 and a vehicle 10 from the acquired image. Then, the position determination unit 124 determines the positions of the person 20 and the vehicle 10 determined by the object determination unit 122.

Next, the detection unit 102 detects that the relative distance between the person 20 and the vehicle 10 included in the image is in a state of being equal to or less than the reference value (Step S103).

When the relative distance between the person 20 and the vehicle 10 included in the image is equal to or less than the reference value (YES in Step S103), the attribute determination unit 126 determines an attribute of the person 20 determined by the object determination unit 122 (Step S104). The attribute determination unit 126 performs image processing on the person 20 included in the image and determines whether the person 20 possesses the first attribute or the second attribute.

Note that the timing for determining an attribute of the person 20 may be before detection of the approaching state of the person 20 and the vehicle 10 by the detection unit 102.

Then, the selection unit 128 selects a type of information to be output, based on the attribute of the person 20 (Step S105).

Then, the output unit 104 outputs information of the selected type (Step S107).

Note that the output unit 104 may also output an image or a voice at the detection of the approaching state by the detection unit 102 or a video captured before and after the detection of the approaching state by the detection unit 102.

During a period in which a person 20 and a vehicle 10 in the approaching state are not detected by the detection unit 102, the processing returns to Step S101 and the processing is repeated.

Figure 7:
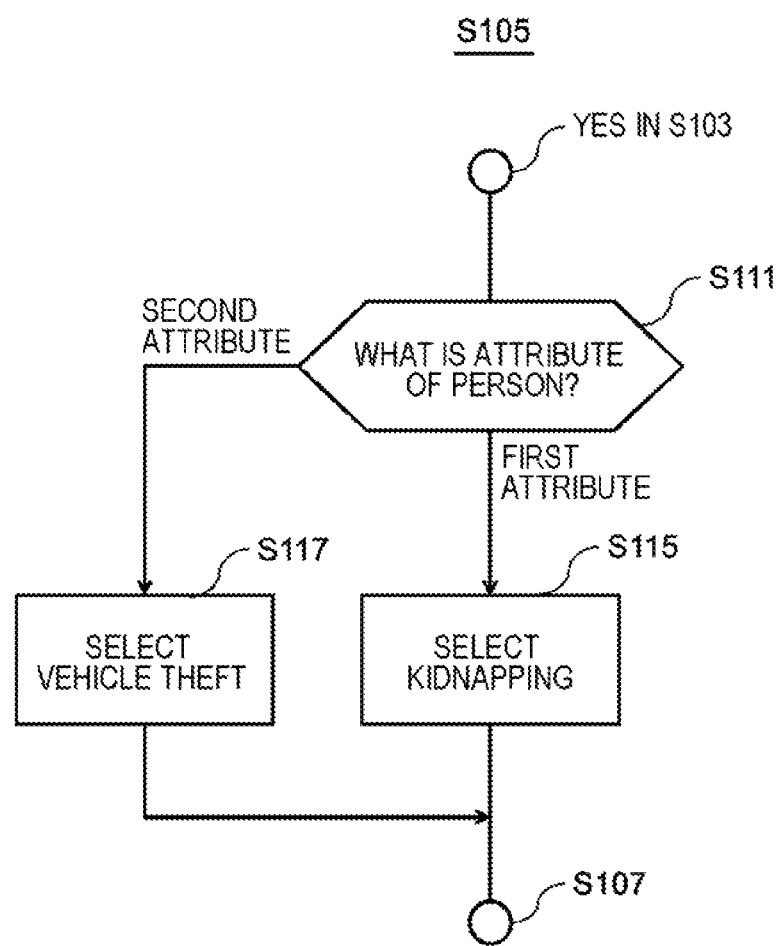
FIG. 7 is a flowchart illustrating an example of operation of the surveillance system.

FIG. 7 is a flowchart illustrating an example of a detailed procedure of Step S105 in FIG. 6. The attribute determination unit 126 determines an attribute of the person 20 detected by the detection unit 102 (Step S111).

When the attribute determination unit 126 determines that the person 20 is a person possessing the first attribute in Step S111, the selection unit 128 selects a type of information indicating that the person 20 may fall victim to a crime. For example, the selection unit 128 selects information indicating that kidnapping of the person 20 may occur (Step S115).

On the other hand, when the attribute determination unit 126 determines that the detected person 20 is a person possessing the second attribute in Step S111, the selection unit 128 selects a type of information indicating that the person 20 may commit a crime against the vehicle 10. For example, the selection unit 128 selects information indicating that the person 20 may commit vehicle theft (Step S117). In other words, the selection unit 128 may also be considered to select whether the person 20 may fall victim to a crime or the vehicle 10 may fall victim to a crime.

The processing returns to Step S107 in FIG. 6 after Step S115 and Step S117.

Returning to FIG. 6, the output unit 104 outputs the selected type of information to a predetermined output destination (Step S107). For example, the output unit 104 may output the selected type of information to a server 220 at a surveillance center, and the server 220 at the surveillance center may output information indicating possible occurrence of kidnapping to a monitor screen on a display apparatus equipped in the surveillance center. Furthermore, an image indicating detection of the approaching state may be displayed.

While display on a monitor screen has been exemplified as information output above, any other technique allowing notification of possible occurrence of a crime may be employed.

For example, selected information output by the output unit 104 may be output by various methods such as voice output, output of a warning sound, transmission of an email to a terminal, and a notification. Further, the output unit 104 may make a change to a voice or a warning sound, a change to a mail content, or a change to a notified content, based on the information selected.

According to the present example embodiment, the detection unit 102 detects a person 20 and a vehicle 10 in the approaching state, the selection unit 128 selects a type of crime, based on the attribute of the person 20, and the output unit 104 outputs the selected information. Thus, a situation in which a criminal act committed against a pedestrian or a vehicle, such as kidnapping or vehicle theft, may occur can be detected by using an image from the surveillance camera 5 capturing an image of an area around a road, and therefore occurrence of a criminal act can be detected. Further, a crime deterrent effect can be expected as surveillance by the surveillance camera 5 becomes widely known.

Further, when the detection unit 102 detects the approaching state of a vehicle 10 and a person 20, the output unit 104 can output information selected based on the attribute of the person 20. Thus, even when a vehicle 10 may fall victim to vehicle theft or the like, a possibility of vehicle theft can be notified before the person 20 gets into the vehicle 10. For example, the output unit 104 may also output a warning message or a warning sound from a speaker or the like in the neighborhood of the spot. Thus, a crime prevention effect can be improved.

Third Example Embodiment

<Functional Configuration Example>

Figure 8:
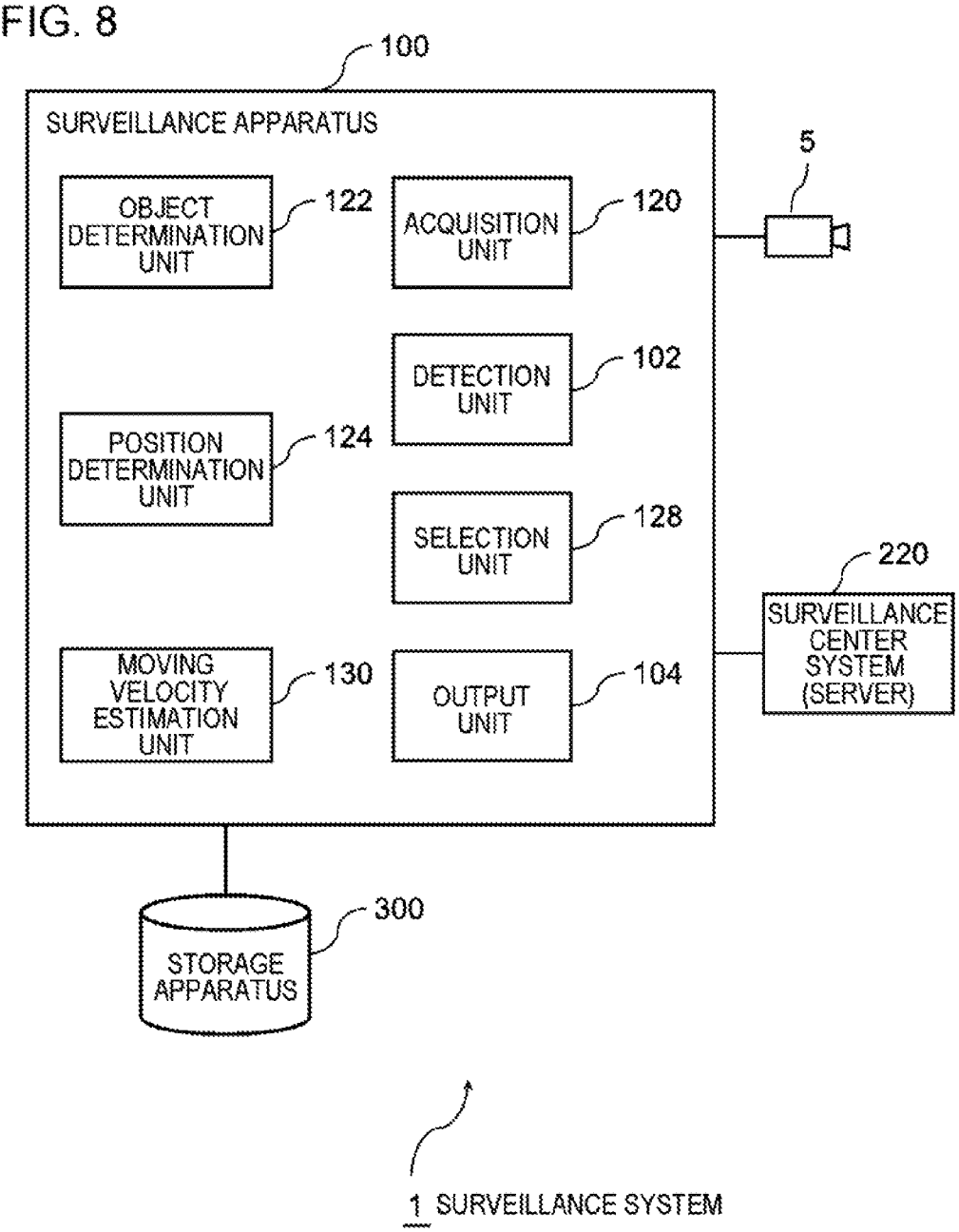
FIG. 8 is a functional block diagram illustrating a logical configuration example of a surveillance system.

FIG. 8 is a functional block diagram illustrating a logical configuration example of the surveillance system in FIG. 1. A surveillance system 1 according to the present example embodiment is similar to those according to the aforementioned example embodiments except for using moving velocity of a vehicle 10 for determination of a type of information to be output instead of using an attribute of a person 20. A surveillance apparatus 100 according to the present example embodiment includes a moving velocity estimation unit 130 in place of the attribute determination unit 126 in FIG. 5.

Note that the configuration according to the present example embodiment may be combined with at least one of the configurations according to the other example embodiments without contradicting each other.

The surveillance apparatus 100 includes an acquisition unit 120, an object determination unit 122, a position determination unit 124, the moving velocity estimation unit 130, a detection unit 102, a selection unit 128, and an output unit 104.

The acquisition unit 120 acquires an image generated by a surveillance camera 5.

The object determination unit 122 determines an object by performing image processing on an image acquired by the acquisition unit 120. The object determination unit 122 recognizes and determines a person 20 and a vehicle 10.

By image processing, the position determination unit 124 determines the positions of a person 20 and a vehicle 10 determined by the object determination unit 122.

The moving velocity estimation unit 130 detects, in a plurality of time-series images, the positions of a feature part of a vehicle 10 determined by the position determination unit 124 and estimates moving velocity from a change in the position of the vehicle 10. Further, the moving velocity estimation unit 130 may detect, in a plurality of time-series images, the positions of a feature part of each of a person 20 and a vehicle 10 determined in an image and estimate a change in velocity of the vehicle 10 relative to the person 20 from a change in a relative positional relation between the person 20 and the vehicle 10. Furthermore, the moving velocity estimation unit 130 can similarly estimate the moving direction of each of the person 20 and the vehicle 10.

For example, the moving velocity estimation unit 130 can estimate at what velocity and from which direction a vehicle 10 approaches a person 20 or at what velocity and in which direction the vehicle 10 moves away from the person 20.

For example, in a case of kidnapping, a vehicle 10 approaches a person 20 from behind at a low speed, puts the person 20 into the vehicle 10, and drives off from the spot. Therefore, when estimating that the moving velocity of a vehicle 10 is low and estimating that the vehicle 10 is moving in a direction approaching a person 20, the moving velocity estimation unit 130 can determine that kidnapping may occur. Further, in a case of vehicle theft, a person 20 approaches a stationary vehicle 10, and the person 20 subsequently goes away. Therefore, when estimating that a vehicle 10 is stationary, the moving velocity estimation unit 130 can determine that vehicle theft may occur. Note that when the moving velocity of a vehicle 10 is normal travel velocity, the vehicle 10 may be determined to be traveling normally.

For each pair of a person 20 and a vehicle 10 included in an image, the detection unit 102 determines whether the pair is in a state of the relative distance being equal to or less than a reference value, that is, an approaching state, based on the positions.

By using the moving velocity of a vehicle 10 estimated by the moving velocity estimation unit 130, the selection unit 128 selects a type of information to be output.

The output unit 104 outputs information of the type selected by the selection unit 128.

<Operation Example>

Figure 9:
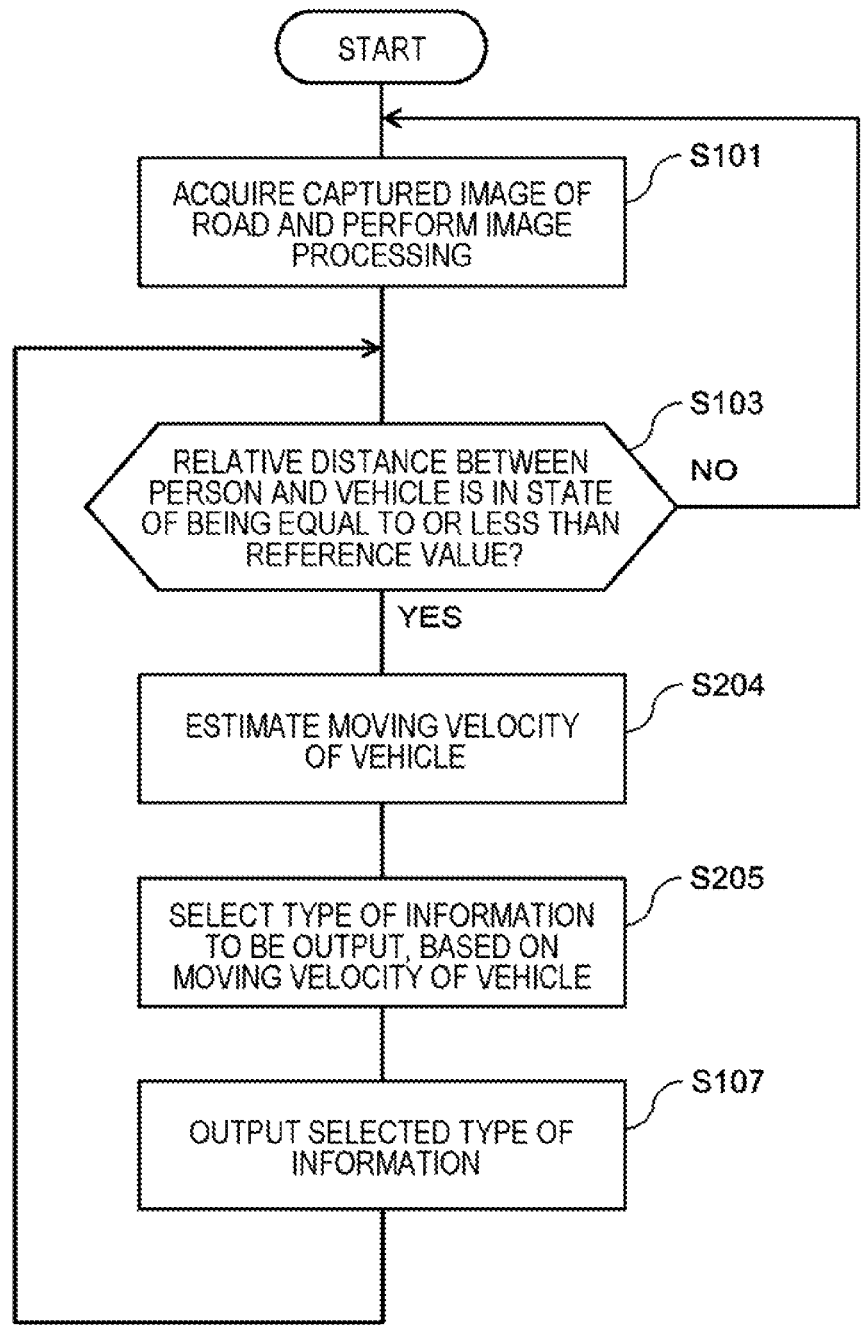
FIG. 9 is a flowchart illustrating an example of operation of the surveillance system.

FIG. 9 is a flowchart illustrating an example of operation of the surveillance system 1. The flowchart in FIG. 9 includes Step S101, Step S103, and Step S107 in the flowchart in FIG. 6 and also includes Step S204 and Step S205 in place of Step S104 and Step S105 in FIG. 6.

The surveillance apparatus 100 acquires an image captured by the surveillance camera 5 and performs image processing (Step S101). Specifically, the object determination unit 122 recognizes and determines a person 20 and a vehicle 10 from the acquired image. Then, the position determination unit 124 determines the positions of the person 20 and the vehicle 10 determined by the object determination unit 122.

Next, the detection unit 102 detects that the relative distance between the person 20 and the vehicle 10 included in the image is in a state of being equal to or less than the reference value (Step S103).

When the relative distance between the person 20 and the vehicle 10 included in the image is equal to or less than the reference value (YES in Step S103), the moving velocity estimation unit 130 estimates the moving velocity of the vehicle 10 (Step S204).

Then, the selection unit 128 selects a type of information to be output, based on the moving velocity of the vehicle 10 (Step S205).

Then, the output unit 104 outputs information of the selected type (Step S107).

Figure 10:
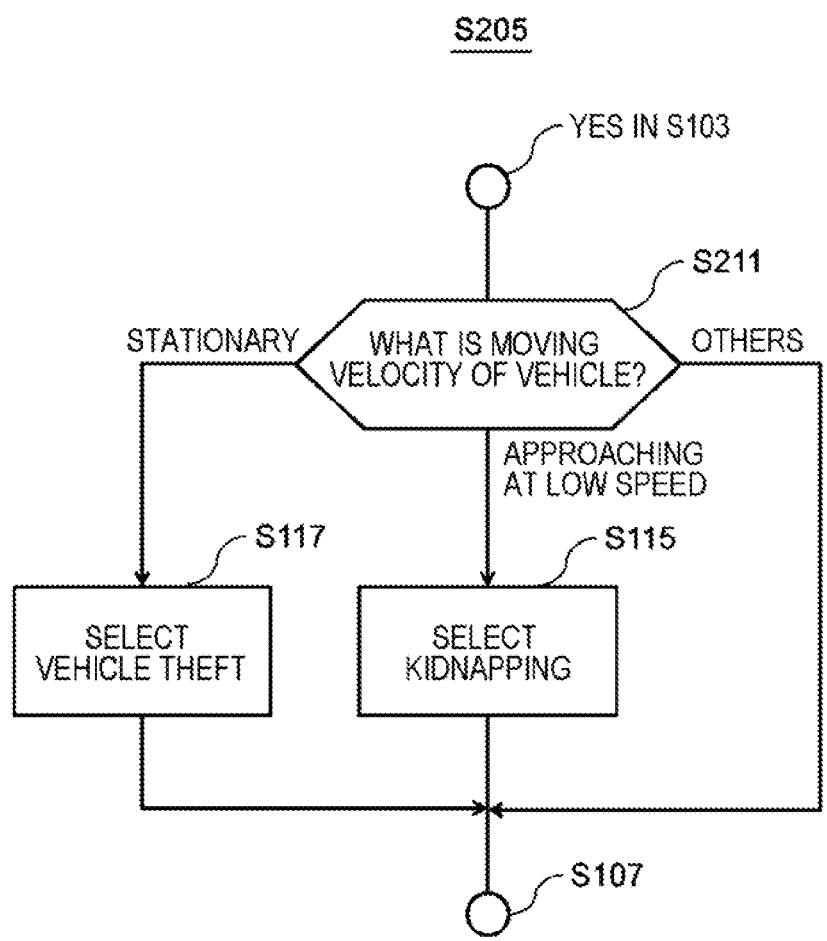
FIG. 10 is a flowchart illustrating an example of operation of the surveillance system.

FIG. 10 is a flowchart illustrating an example of a detailed procedure of Step S205 in FIG. 9. The moving velocity estimation unit 130 determines the moving velocity of the vehicle 10 (Step S211). When the moving velocity estimation unit 130 determines that the vehicle 10 is approaching the person 20 at a low speed in Step S211, the selection unit 128 determines that the person 20 may fall victim to a crime and selects a type of information indicating that the person 20 may fall victim to a crime as a type of information to be output. For example, the selection unit 128 selects information indicating that kidnapping of the person 20 may occur (Step S115). On the other hand, when the moving velocity estimation unit 130 determines that the vehicle 10 is stationary in Step S211, the selection unit 128 determines that the person 20 may commit a crime and selects a type of information indicating that the person 20 may commit a crime as a type of information to be output. For example, the selection unit 128 selects information indicating that the person 20 may commit vehicle theft (Step S117). The processing returns to Step S107 in FIG. 9 after Step S115 and Step S117.

Further, when the moving velocity estimation unit 130 determines that the moving velocity of the vehicle 10 indicates neither approaching at a low speed nor stationary in Step S211, the vehicle 10 may be determined to be merely passing, and therefore the processing returns to Step S107 in FIG. 9.

Returning to FIG. 9, the output unit 104 outputs information of the selected type (Step S107). When a person 20 and a vehicle 10 in the approaching state are not detected (NO in Step S103), the processing returns to Step S101, and the processing is repeated.

According to the present example embodiment, the detection unit 102 detects a person 20 and a vehicle 10 in the approaching state, and the selection unit 128 determines, by using the moving velocity of the vehicle 10, whether the person 20 may fall victim to a crime or the person 20 may commit a crime and selects information based on the determination result. Then, the output unit 104 outputs the selected information. Thus, by using an image from the surveillance camera 5 capturing an image of an area around a road, a type of criminal act such as kidnapping or vehicle theft can be detected. Further, a crime deterrent effect can be expected due to a wide spread of a fact that surveillance is being performed by the surveillance camera 5.

Fourth Example Embodiment

<Functional Configuration Example>

Figure 11:
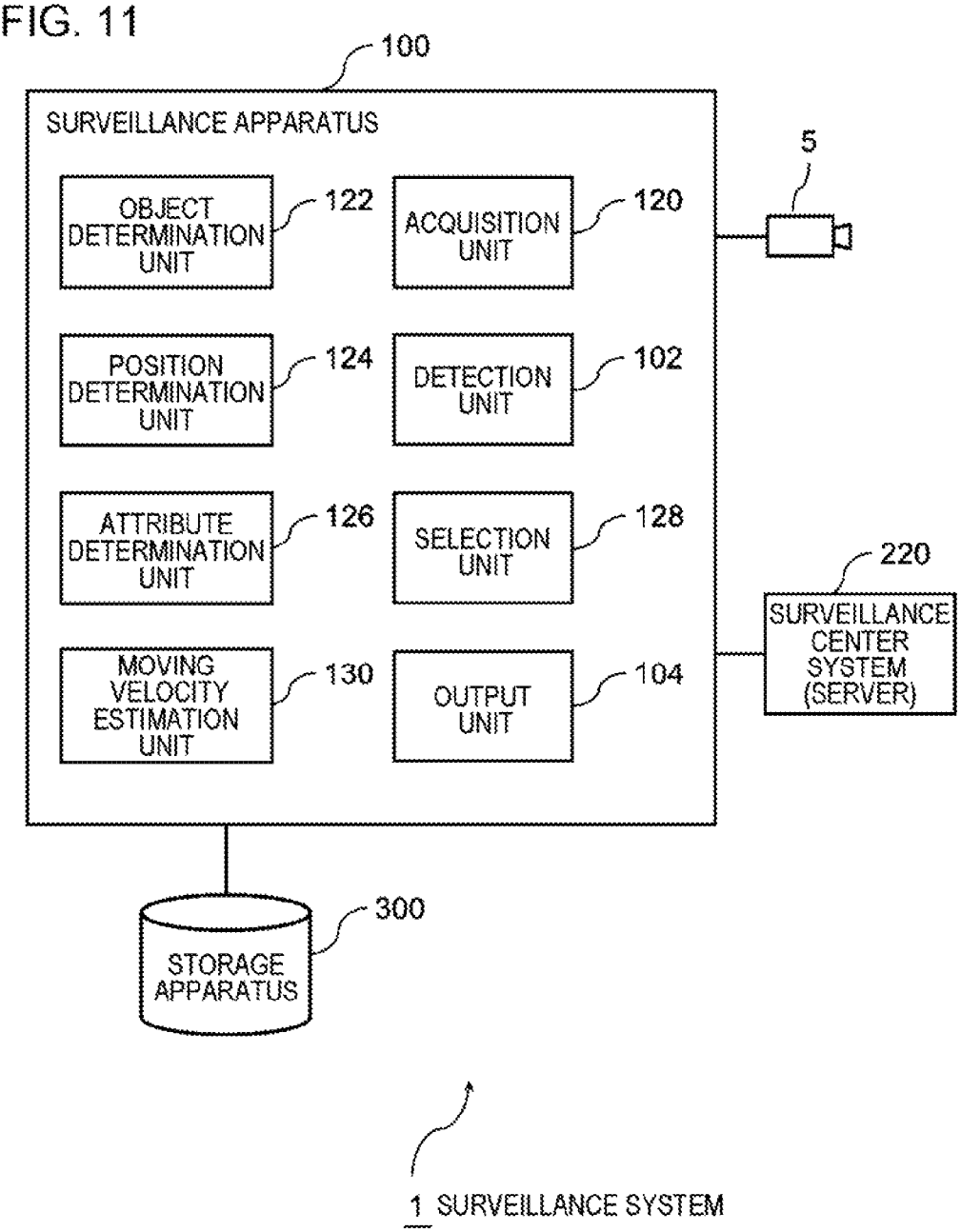
FIG. 11 is a functional block diagram illustrating a logical configuration example of a surveillance system.

FIG. 11 is a functional block diagram illustrating a logical configuration example of the surveillance system in FIG. 1. A surveillance system 1 according to the present example embodiment is similar to that according to either of the second example embodiment and the third example embodiment except that a surveillance apparatus 100 has both the function according to the second example embodiment and the function according to the third example embodiment. The surveillance apparatus 100 according to the present example embodiment may be combined with at least one of the configurations according to the other example embodiments without contradicting each other.

The surveillance apparatus 100 includes an acquisition unit 120, an object determination unit 122, a position determination unit 124, an attribute determination unit 126, a moving velocity estimation unit 130, a detection unit 102, a selection unit 128, and an output unit 104.

The acquisition unit 120 acquires an image generated by the surveillance camera 5.

The object determination unit 122 determines an object by performing image processing on an image acquired by the acquisition unit 120. The object determination unit 122 recognizes and determines a person 20 and a vehicle 10.

By image processing, the position determination unit 124 determines the positions of a person 20 and a vehicle 10 determined by the object determination unit 122.

The attribute determination unit 126 determines an attribute of a person 20 by image processing. The attribute determination unit 126 determines whether the person 20 possesses a first attribute or a second attribute.

The moving velocity estimation unit 130 detects, in a plurality of time-series images, the positions of a feature part of a vehicle 10 determined by the position determination unit 124 and estimates moving velocity from a change in the position of the vehicle 10.

For each pair of a person 20 and a vehicle 10 included in an image, the detection unit 102 determines whether the relative distance is in a state of being equal to or less than a reference value, that is, an approaching state, based on the positions.

The selection unit 128 selects a type of information to be output, by using the moving velocity of a vehicle 10 estimated by the moving velocity estimation unit 130 and an attribute determined by the attribute determination unit 126.

The output unit 104 outputs information of the type selected by the selection unit 128.

<Operation Example>

Figure 12:
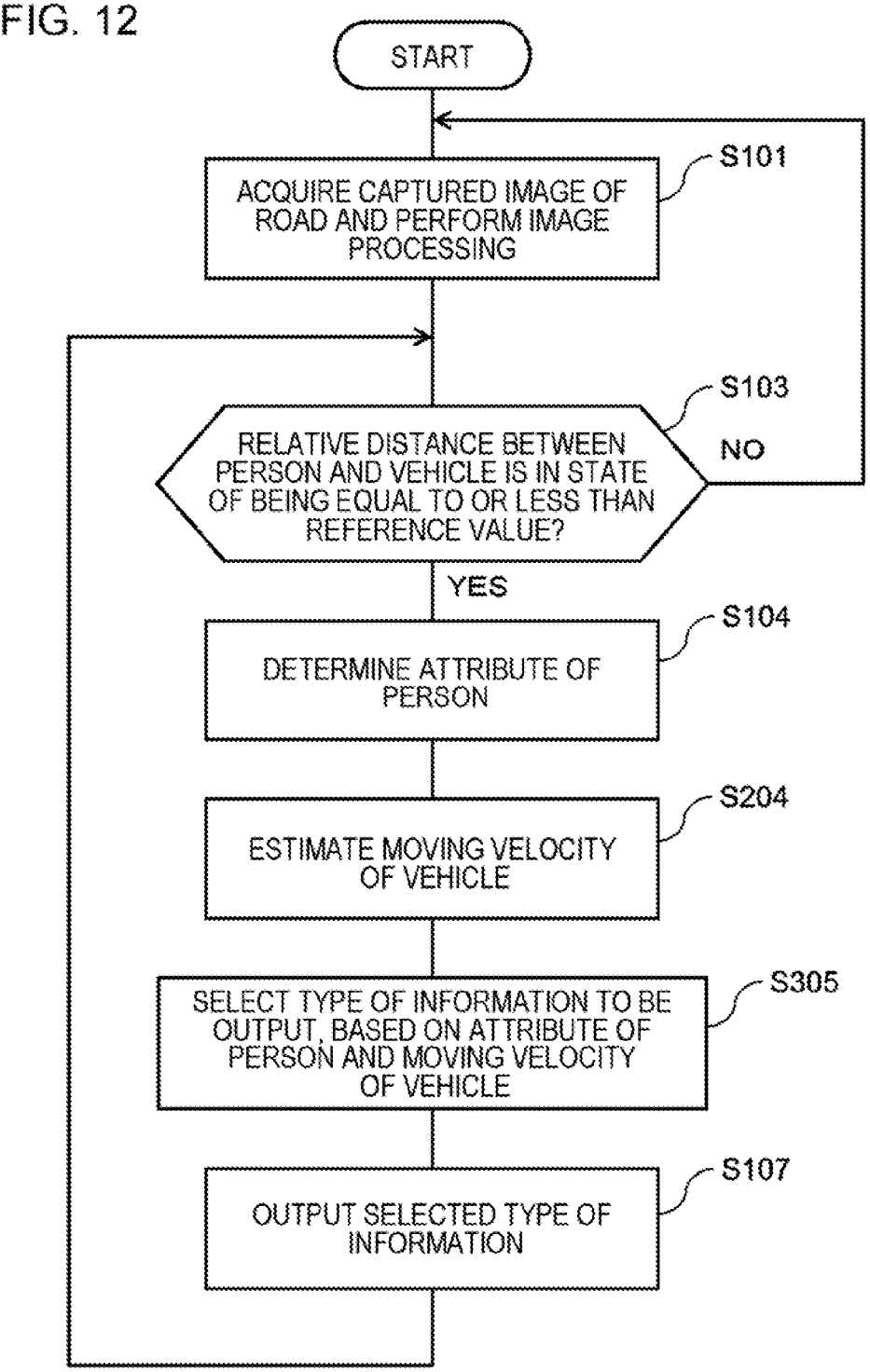
FIG. 12 is a flowchart illustrating an example of operation of the surveillance apparatus.

FIG. 12 is a flowchart illustrating an example of operation of the surveillance system 1. The flowchart in FIG. 12 includes Step S101, Step S103, Step S104, and Step S107 in the flowchart in FIG. 6 and Step S204 in FIG. 9 and also includes Step S305 in place of Step S105 in FIG. 6 or Step S205 in FIG. 9.

The surveillance apparatus 100 acquires an image captured by the surveillance camera 5 and performs image processing (Step S101). Specifically, the object determination unit 122 recognizes and determines each of a person 20 and a vehicle 10 from the acquired image. Then, the position determination unit 124 determines the positions of the person 20 and the vehicle 10 determined by the object determination unit 122.

Next, the detection unit 102 detects that the relative distance between the person 20 and the vehicle 10 included in the image is in a state of being equal to or less than the reference value (Step S103).

When the relative distance between the person 20 and the vehicle 10 included in the image is equal to or less than the reference value (YES in Step S103), the attribute determination unit 126 determines an attribute of the person 20 determined by the object determination unit 122 (Step S104). Furthermore, the moving velocity estimation unit 130 detects, in a plurality of time-series images, the positions of a feature part of the vehicle 10 determined by the position determination unit 124 and estimates the moving velocity of the vehicle 10 from a change in the position of the vehicle 10 (Step S204).

Then, the selection unit 128 selects a type of information to be output, based on the attribute of the person 20 and the moving velocity of the vehicle 10 (Step S305).

Then, the output unit 104 outputs information of the selected type (Step S107).

Figure 13:
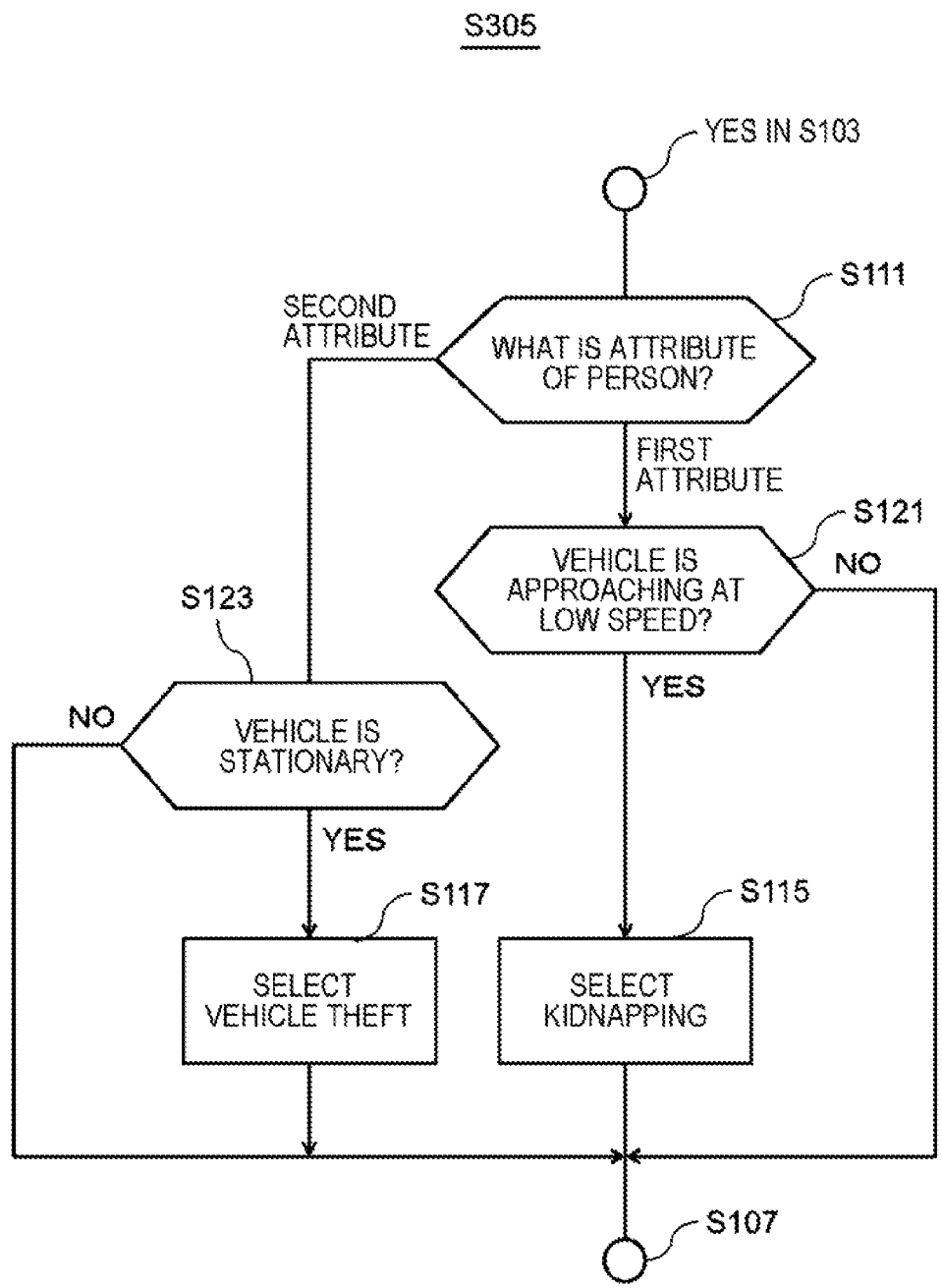
FIG. 13 is a flowchart illustrating an example of operation of the surveillance system.

FIG. 13 is a flowchart illustrating an example of a detailed procedure of Step S305 in FIG. 12. The attribute determination unit 126 determines an attribute of the person 20 determined by the object determination unit 122 (Step S111). In Step S111, the attribute determination unit 126 determines whether the person 20 is a person possessing the first attribute and when determining that the person 20 is a person possessing the first attribute, advances to Step S121. On the other hand, when determining that the person 20 is a person possessing the second attribute in Step S111, the attribute determination unit 126 advances to Step S123.

When the moving velocity estimation unit 130 determines that the vehicle 10 is approaching the person 20 at a low speed in Step S121 (YES in Step S121), the selection unit 128 determines that the person 20 may fall victim to a crime and selects a type of information indicating that the person 20 may fall victim to a crime as a type of information to be output. For example, the selection unit 128 selects information indicating that kidnapping of the person 20 may occur (Step S115). When the moving velocity estimation unit 130 determines that the vehicle 10 is not approaching the person 20 at a low speed (NO in Step S121), the vehicle 10 may be determined to be merely passing, and therefore the processing returns to Step S107 in FIG. 12.

When the moving velocity estimation unit 130 determines that the vehicle 10 is stationary in Step S123 (YES in Step S123), the selection unit 128 determines that the vehicle 10 is stationary, determines that the person 20 may commit a crime, and selects a type of information indicating that the person 20 may commit a crime as a type of information to be output. For example, the selection unit 128 selects information indicating that the person 20 may commit vehicle theft (Step S117). When the moving velocity estimation unit 130 determines that the vehicle 10 is not stationary (NO in Step S123), the vehicle 10 is determined to be merely passing, and therefore the processing returns to Step S107 in FIG. 12.

The processing returns to Step S107 in FIG. 12 after Step S115 and Step S117.

Figure 14:
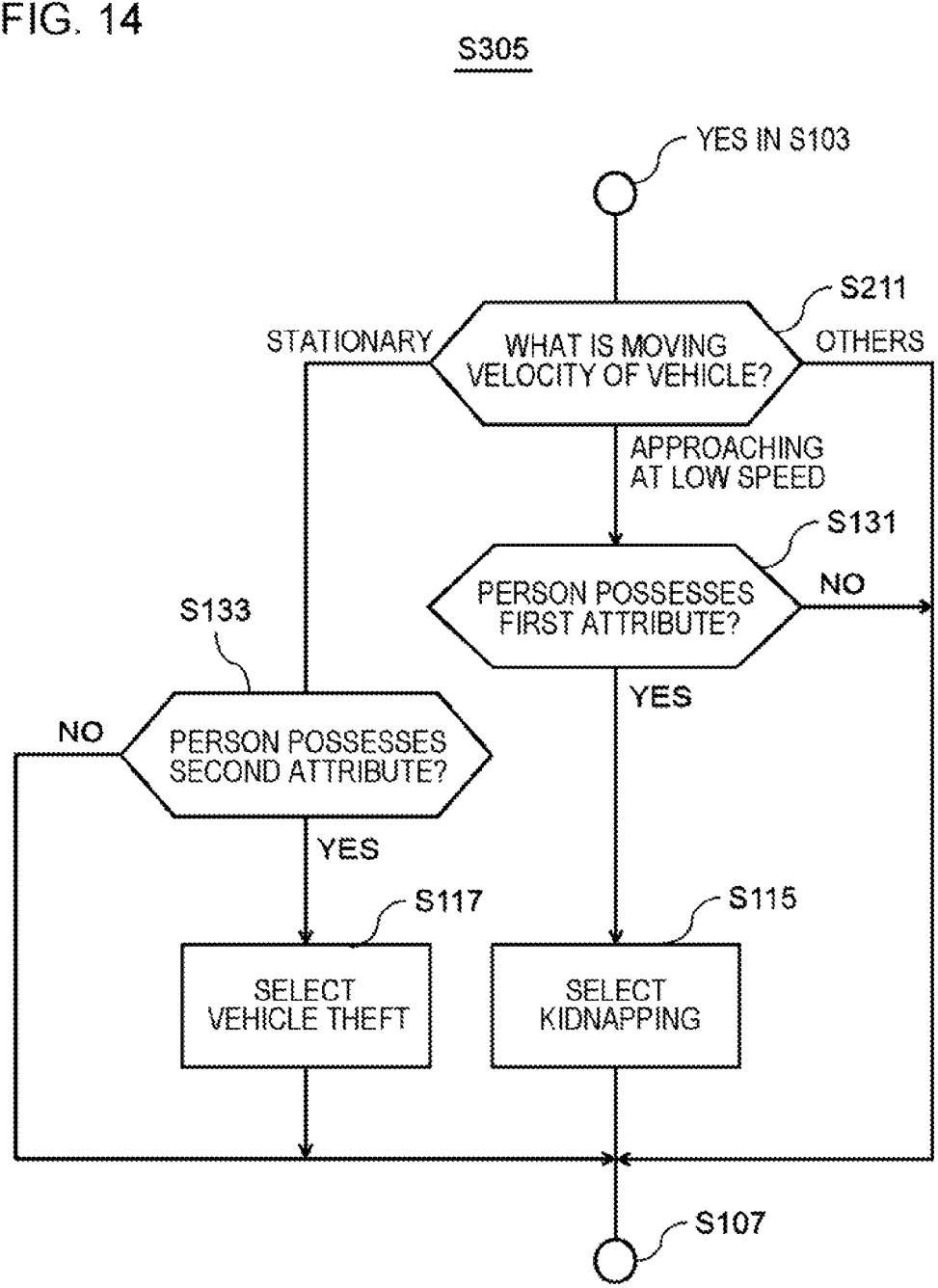
FIG. 14 is a flowchart illustrating an example of operation of the surveillance system.

FIG. 14 is a flowchart illustrating another example of a detailed procedure of Step S305 in FIG. 12. The procedure illustrated in FIG. 14 is the same as the procedure in FIG. 13 except that a determination using the moving velocity of the vehicle 10 is made earlier (Step S211) and subsequently a determination using the attribute of the person 20 is made (Step S131 and Step S133).

The selection unit 128 makes a determination, based on the moving velocity of the vehicle 10 estimated by the moving velocity estimation unit 130 (Step S211). When the moving velocity estimation unit 130 determines that the vehicle 10 is approaching the person 20 at a low speed in Step S211, the processing advances to Step S131. When the moving velocity estimation unit 130 determines that the vehicle 10 is stationary in Step S211, the processing advances to Step S133. Further, when the moving velocity estimation unit 130 determines that the moving velocity of the vehicle 10 indicates neither approaching at a low speed nor stationary in Step S211, the vehicle 10 may be determined to be merely passing, and therefore the processing returns to Step S107 in FIG. 12.

When the attribute determination unit 126 determines that the person 20 is a person possessing the first attribute in Step S131 (YES in Step S131), the selection unit 128 selects a type of information indicating that the person 20 may fall victim to a crime as a type of information to be output. For example, the output unit 104 selects information indicating that kidnapping of the person 20 may occur (Step S115). When the attribute determination unit 126 determines that the person 20 is not a person possessing the first attribute (NO in Step S131), the processing returns to Step S107 in FIG. 12.

When the attribute determination unit 126 determines that the person 20 is a person possessing the second attribute in Step S133 (YES in Step S133), the selection unit 128 determines that the person 20 may commit a crime and selects a type of information indicating that the person 20 may commit a crime as a type of information to be output. For example, the selection unit 128 selects information indicating that the person 20 may commit vehicle theft (Step S117). When the attribute determination unit 126 determines that the person 20 is not a person possessing the second attribute (NO in Step S133), the processing returns to Step S107 in FIG. 12.

The processing returns to Step S107 in FIG. 12 after Step S115 and Step S117.

When the vehicle 10 is determined to be merely passing or stopping in Step S121 or Step S123, or Step S211, Step S131, or Step S133 in the flowchart in FIG. 13 or FIG. 14, a type of information to be output is not selected, and therefore the output unit 104 performs processing without outputting information in Step S107 in FIG. 12. However, when the vehicle 10 is determined to be merely passing or stopping in Step S121 or Step S123, or Step S211, Step S131, or Step S133 in the flowchart in FIG. 13 or FIG. 14, passage or stopping of the vehicle 10 may be respectively selected as a type of information to be output. In that case, the output unit 104 may select and output information indicating passage or stopping of the vehicle 10 in Step S107 in FIG. 12.

The present example embodiment provides an effect similar to those of the aforementioned example embodiments and can further select a type of information to be output, by using both the moving velocity of a vehicle 10 and an attribute of a person 20, and therefore increases the possibility to more precisely detect a criminal act.

Fifth Example Embodiment

<Functional Configuration Example>

Figure 15:
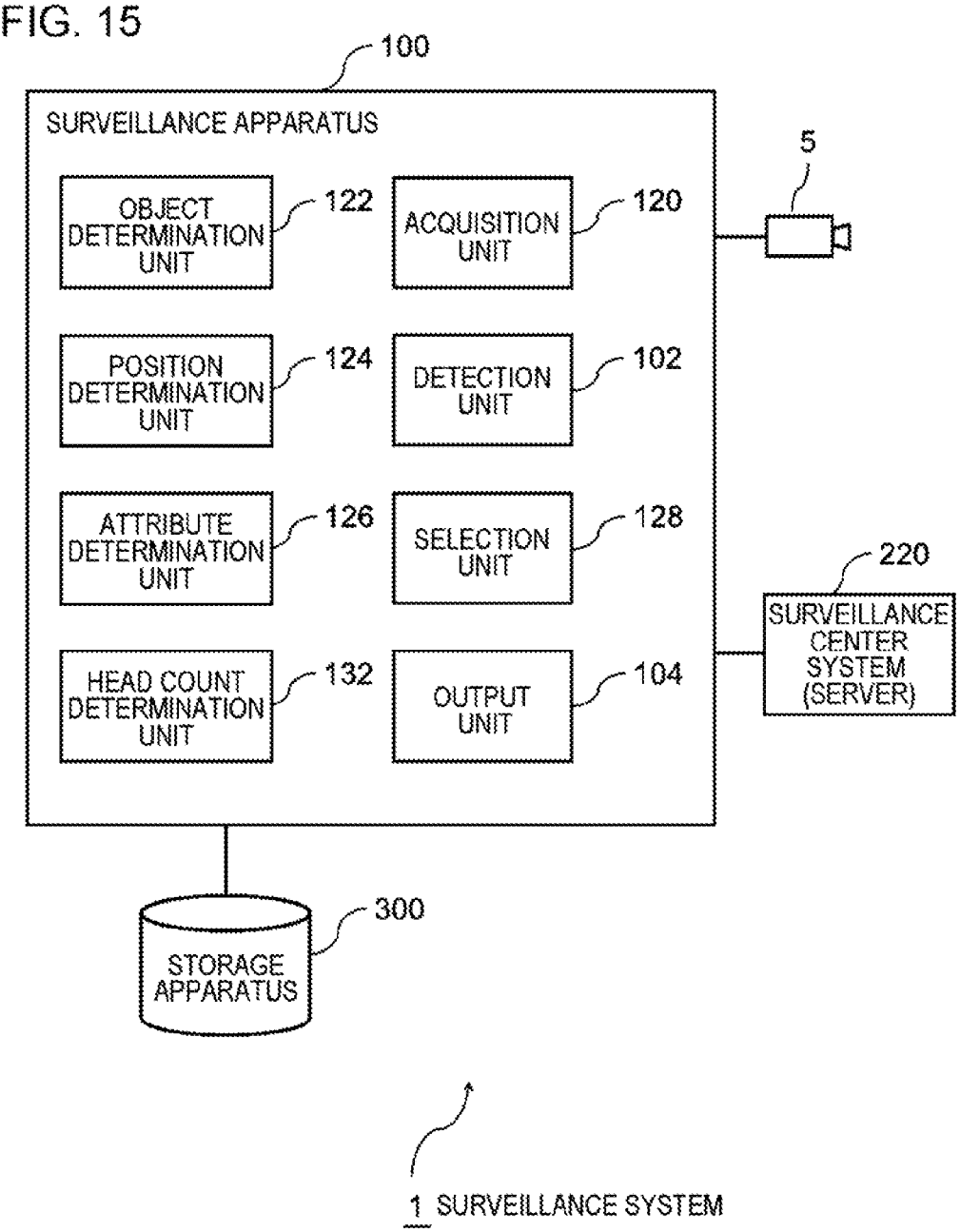
FIG. 15 is a functional block diagram illustrating a logical configuration example of a surveillance system.

FIG. 15 is a functional block diagram illustrating a logical configuration example of the surveillance system in FIG. 1. A surveillance system 1 according to the present example embodiment is the same as that according to the second example embodiment except for selecting a type of information to be output, based on whether a person 20 is taking an independent action. In addition to the configuration according to the second example embodiment in FIG. 5, a surveillance apparatus 100 according to the present example embodiment further includes a head count determination unit 132. Note that the surveillance apparatus 100 according to the present example embodiment may be combined with at least one of the configurations according to the other example embodiments without contradicting each other.

The surveillance apparatus 100 includes an acquisition unit 120, an object determination unit 122, a position determination unit 124, an attribute determination unit 126, the head count determination unit 132, a detection unit 102, a selection unit 128, and an output unit 104.

The acquisition unit 120 acquires an image generated by a surveillance camera 5.

The object determination unit 122 determines an object by performing image processing on an image acquired by the acquisition unit 120. The object determination unit 122 recognizes and determines a person 20 and a vehicle 10.

The position determination unit 124 determines the positions of a person 20 and a vehicle 10 determined by the object determination unit 122.

The attribute determination unit 126 determines an attribute of a person 20 by image processing. The attribute determination unit 126 determines whether the person 20 possesses a first attribute or a second attribute.

The head count determination unit 132 determines the number of persons 20. For example, the head count determination unit 132 determines whether a plurality of persons 20 are determined by the object determination unit 122. When the object determination unit 122 determines a plurality of persons 20, the head count determination unit 132 determines whether persons the distance between whom is equal to or less than a reference value exist among the persons 20. For example, the head count determination unit 132 determines whether persons the distance between whom is equal to or less than the reference value exist among a plurality of persons 20, based on the positions of the persons 20 determined by the position determination unit 124. Note that the reference value may be the same value as a reference value for determining the relative distance between a vehicle 10 and a person 20 or may be a different value.

When persons the distance between whom is equal to or less than the reference value exist among the plurality of persons 20, the head count determination unit 132 determines that the persons do not take independent actions. The head count determination unit 132 determines that an independent action is being taken when a plurality of persons 20 do not exist or persons the distance between whom is equal to or less than the reference value do not exist among a plurality of persons 20.

The reason is that kidnapping is likely to occur particularly when a person is alone. Note that an independent action may involve not only a single person but also a small number of persons such as two or three persons.

For each pair of a person 20 and a vehicle 10 included in an image, the detection unit 102 determines whether the relative distance is in a state of being equal to or less than a reference value, that is, an approaching state, based on the positions.

The selection unit 128 selects a type of information to be output depending on whether a determination result made by the head count determination unit 132 indicates that a person 20 is taking an independent action.

The output unit 104 outputs information of the type selected by the selection unit 128.

<Operation Example>

Figure 16:
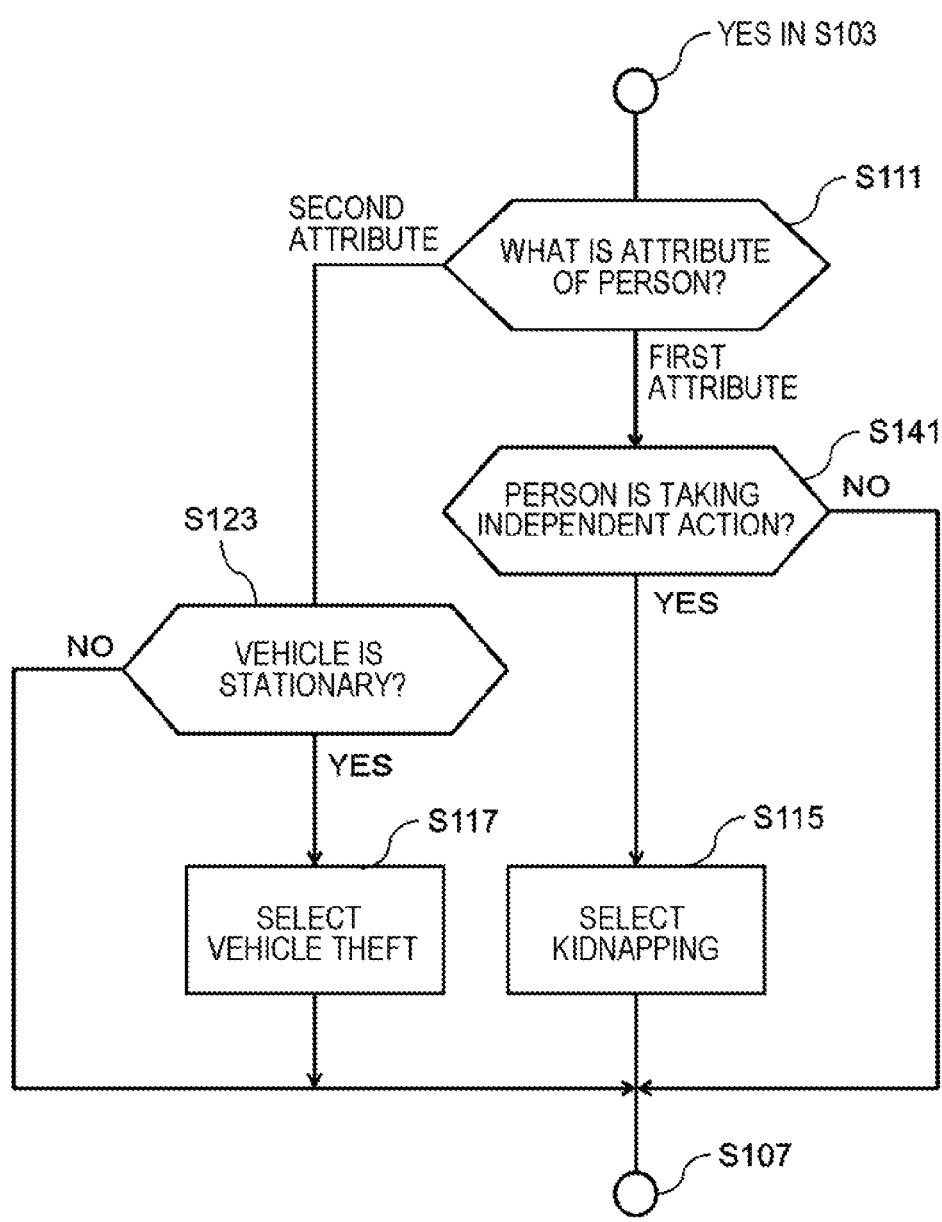
FIG. 16 is a flowchart illustrating an example of operation of the surveillance system.

FIG. 16 is a flowchart illustrating an example of operation of the surveillance system 1. The flowchart in FIG. 16 includes Step S141 in place of Step S121 in the flowchart in FIG. 13. However, the flowchart in FIG. 16 may include Step S121 in FIG. 13. The order of Step S121 and Step S141 is not particularly limited.

The attribute determination unit 126 determines an attribute of the person 20 determined by the object determination unit 122 (Step S111). When determining that the person 20 possesses the first attribute in Step S111, the attribute determination unit 126 advances to Step S141. On the other hand, when determining that the person 20 possesses the second attribute in Step S111, the attribute determination unit 126 advances to Step S123.

When the head count determination unit 132 determines that the person 20 is taking an independent action in Step S141 (YES in Step S141), the selection unit 128 selects a type of information indicating that the person 20 may fall victim to a crime as a type of information to be output. For example, the output unit 104 selects information indicating that kidnapping of the person 20 may occur (Step S115). When the head count determination unit 132 determines that the person 20 is not taking an independent action (NO in Step S141), the vehicle 10 may be determined to be merely passing, and therefore the processing returns to Step S107 in FIG. 12.

Processing in and after Step S123 is the same as that in FIG. 13, and therefore description thereof is not repeated.

Figure 17:
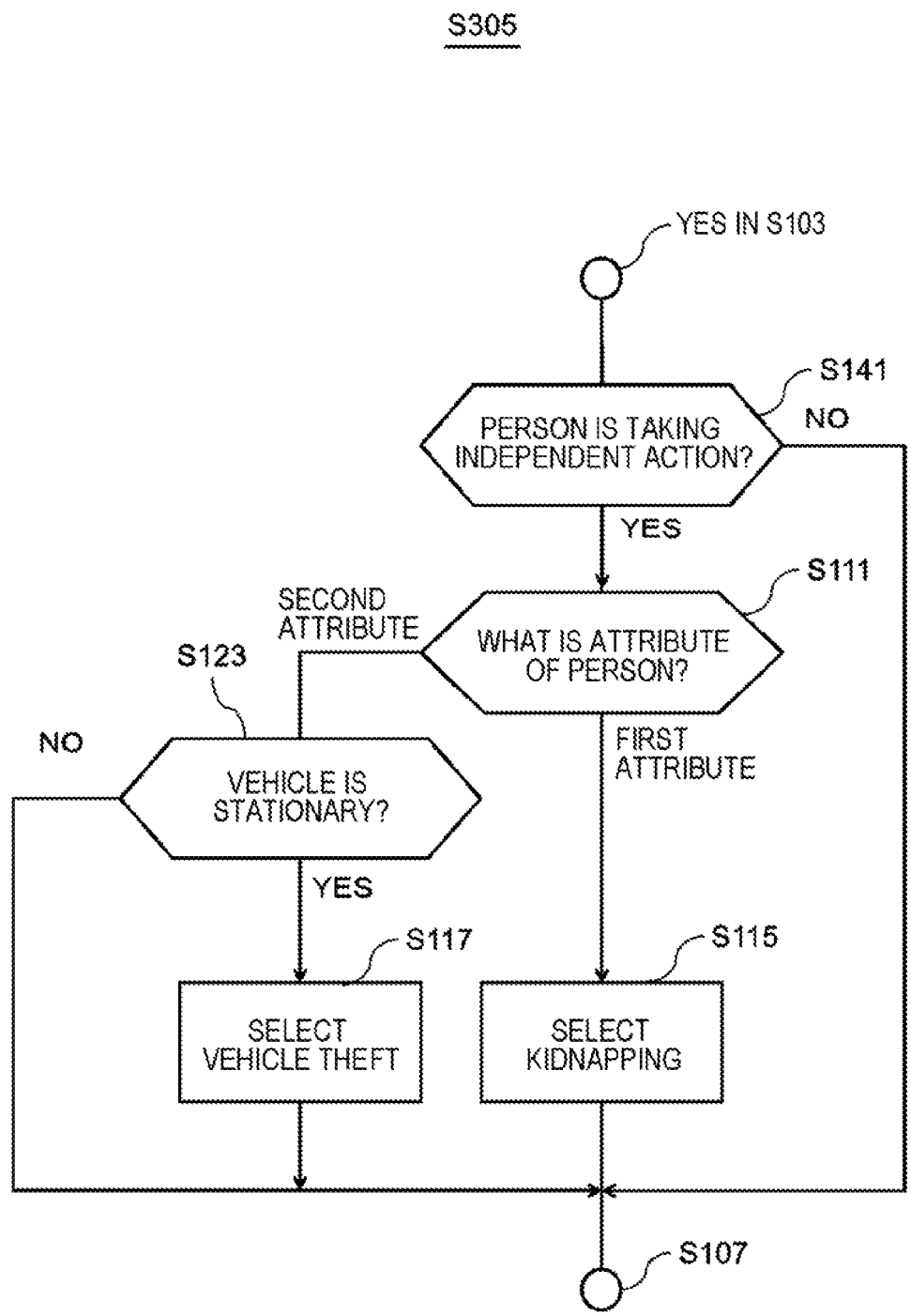
FIG. 17 is a flowchart illustrating an example of operation of the surveillance system.

FIG. 17 is a flowchart illustrating another example of operation of the surveillance system 1. The flowchart in FIG. 17 is the same as that in FIG. 16 except that the order of Step S111 and Step S141 is reversed in the flowchart in FIG. 16. The flowchart in FIG. 17 may include Step S121 in FIG. 13. In that case, the order of Step S121 and Step S141 is not particularly limited.

The head count determination unit 132 determines whether the person 20 is taking an independent action (Step S141). When the head count determination unit 132 determines that the person 20 is taking an independent action in Step S141 (YES in Step S141), the processing advances to to Step S111. When the head count determination unit 132 determines that the person 20 is not taking an independent action in Step S141 (NO in Step S141), the vehicle 10 is determined to be merely passing, and therefore the processing returns to Step S107 in FIG. 12.

In Step S111, the attribute determination unit 126 determines an attribute of the person 20 determined by the object determination unit 122. When the attribute determination unit 126 determines that the person 20 possesses the first attribute in Step S111, the processing advances to Step S115. On the other hand, when the attribute determination unit 126 determines that the person 20 possesses the second attribute in Step S111, the processing advances to Step S123. Processing from here onward is the same as that in FIG. 16, and therefore description thereof is not repeated.

The present example embodiment enables determination of whether a person 20 is taking an independent action by the head count determination unit 132 and when the person 20 is taking an independent action, enables output that kidnapping is highly likely to occur. By combination with another condition, determination precision can be further improved and frequent notification can be prevented.

Sixth Example Embodiment

<Functional Configuration Example>

A surveillance system 1 according to the present example embodiment differs from that according to the aforementioned fourth example embodiment in being configured to detect that a vehicle 10 is in a stationary state and that entry and exit of a person 20 are performed after the vehicle becomes stationary and to select a type of information to be output by using the result. Specifically, operation of a detection unit 102 and operation of a selection unit 128 are different. The surveillance system 1 is described below by using the functional block diagram according to the fourth example embodiment in FIG. 11. Note that a surveillance apparatus 100 according to the present example embodiment may be combined with at least one of the configurations according to the other example embodiments without contradicting each other.

For each pair of a person 20 and a vehicle 10 included in an image, the detection unit 102 determines whether the relative distance is in a state of being equal to or less than a reference value, that is, an approaching state, based on the positions. Further, when determining that a vehicle 10 determined to be in the approaching state by the detection unit 102 is in the stationary state from moving velocity estimated by the moving velocity estimation unit 130, the detection unit 102 further detects whether entry and exit of a person into and from the vehicle 10 are made.

The selection unit 128 selects a type of information to be output, by further using a detection result of entry and exit of a person by the detection unit 102.

Figure 18A:
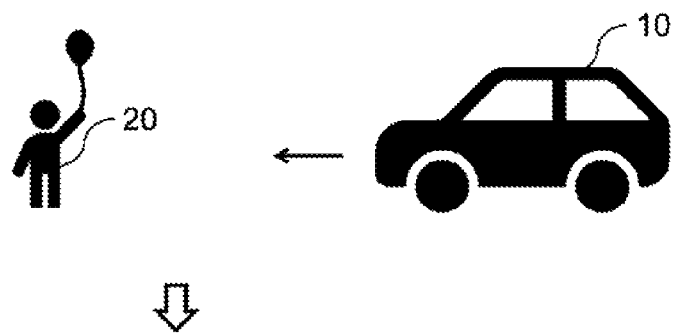
FIGS. 18A to 18C are diagrams for each illustrating a positional relation between a vehicle and a person in a case of kidnapping.
Figure 18B:
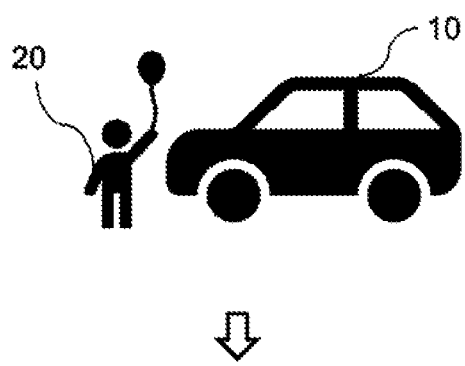
Figure 18C:

For example, as illustrated in FIG. 18, in a case of kidnapping, a vehicle 10 may approach a person 20 (in FIG. 18A to in FIG. 18B), grab the person 20 by extending only an arm from the vehicle 10, drag the person 20 into the vehicle 10, and take the person 20 away (in FIG. 18C). In other words, a person does not come out of the stationary vehicle 10 in the case of kidnapping. In a case of vehicle theft, a driver is highly likely to come out of a stationary vehicle 10. By detecting the situations, kidnapping and vehicle theft are discriminated.

<Operation Example>

Figure 19:
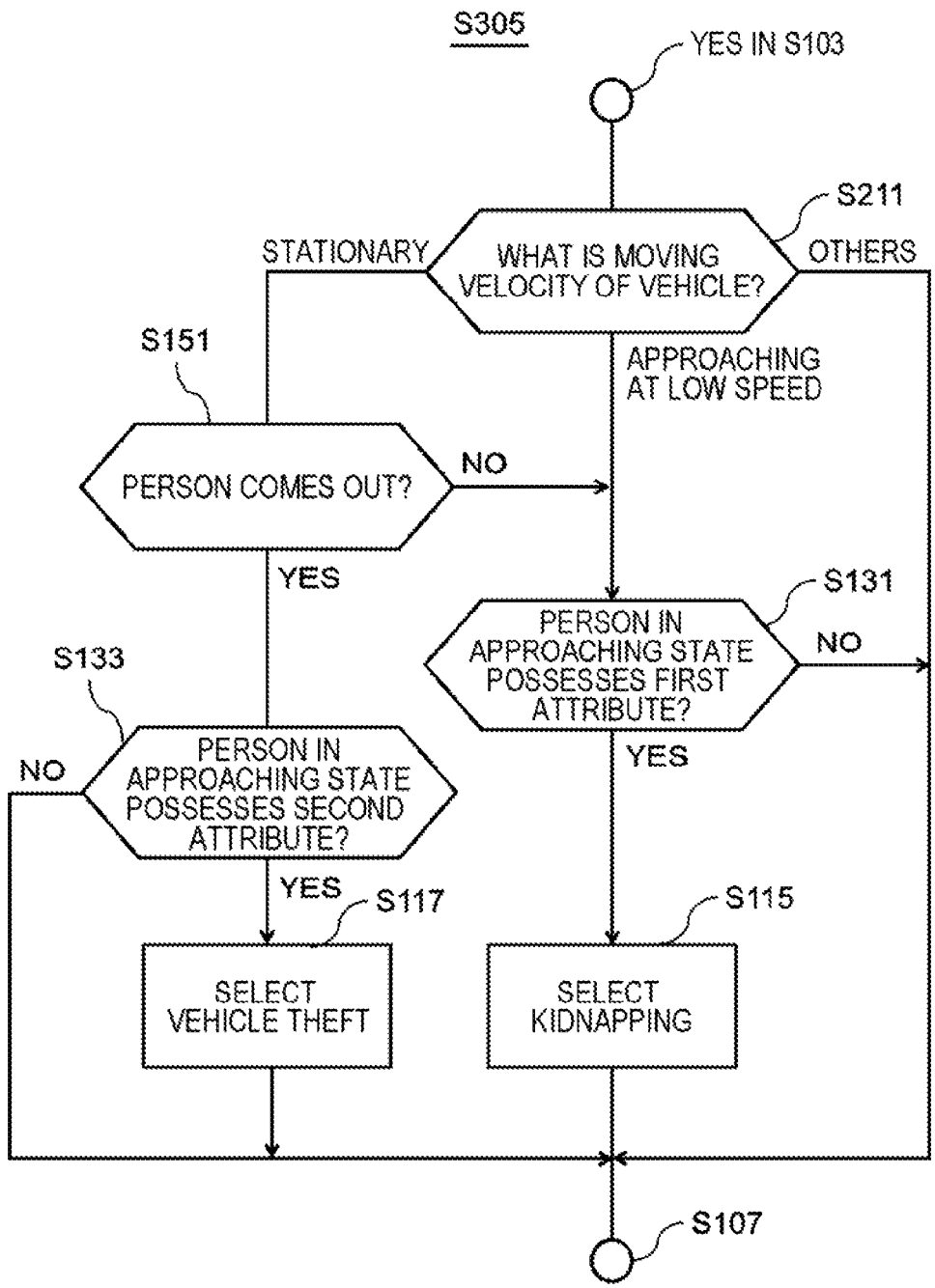
FIG. 19 is a flowchart illustrating an example of operation of a surveillance system.

FIG. 19 is a flowchart illustrating an example of operation of the surveillance system 1. The flowchart in FIG. 19 includes Step S211, Step S131, Step S133, Step S115, and Step S117 in the flowchart in FIG. 14 and further includes Step S151.

In Step S211, when the moving velocity estimation unit 130 estimates that the vehicle 10 is moving at a low speed and the detection unit 102 determines that the vehicle 10 is approaching the person 20, the process advances to Step S131, and the attribute determination unit 126 determines an attribute of the person 20.

Next, when determining that the vehicle 10 is stationary in Step S211, the moving velocity estimation unit 130 advances to Step S151. In Step S151, the detection unit 102 determines whether a person, that is, a driver comes out of the stationary vehicle 10. For example, the detection unit 102 may detect entry and exit of a person by determining whether a person comes out of the vehicle 10 within a predetermined time from the determination that the vehicle is in the stationary state by the moving velocity estimation unit 130.

When the detection unit 102 detects that a person does not come out of the vehicle 10 within the predetermined time (NO in Step S151), the possibility of kidnapping is high, and therefore the processing advances to Step S131. Further, when the moving velocity estimation unit 130 determines that the moving velocity of the vehicle 10 indicates neither approaching at a low speed nor stationary in Step S211, the vehicle 10 may be determined to be merely passing, and therefore the processing returns to Step S107 in FIG. 12. Processing in and after Step S131 is the same as that according to the aforementioned example embodiments, and therefore description thereof is not repeated.

On the other hand, when the detection unit 102 detects a person coming out of the vehicle 10 (YES in Step S151), the attribute determination unit 126 determines an attribute of the person 20 in the approaching state (Step S133). Then, when the attribute determination unit 126 determines that the person possesses the second attribute (YES in Step S133), the selection unit 128 selects information indicating that the person 20 may commit vehicle theft, similarly to FIG. 14 (Step S117).

The present example embodiment enables selection of a type of information to be processed by detecting whether a person comes out of a stationary vehicle 10. Accordingly, determination precision can be further improved.

While the example embodiments of the present invention have been described above with reference to the drawings, the example embodiments are exemplifications of the present invention, and various configurations other than those described above may be employed.

For example, since detection of a criminal act is performed by using an image from the surveillance camera 5, an image at detection of the criminal act can be recorded, and the record can be used as evidence at occurrence of a crime. The above can lead to early resolution of a case, arrest of a culprit, and rescue of a victim.

Furthermore, the detection unit 102 may perform processing by using an image from a specific surveillance camera 5 out of a plurality of surveillance cameras 5 each capturing an image of an area around a road. As described above, surveillance may be performed by using an image from a surveillance camera 5 installed at a particularly unsafe location, a location where criminal acts such as kidnapping and vehicle theft frequently occur, or the like. Further, priority may be given to a specific surveillance camera 5, and the proportion of surveillance time of the high-priority surveillance camera 5 may be set longer than that of another surveillance camera 5.

Furthermore, the detection unit 102 may acquire and store a facial image of a person 20, the relative distance between a vehicle 10 and the person 20 being detected to be in a state of being equal to or less than a reference value. The facial image may be stored in the memory 1030 or the storage device 1040 in FIG. 3, or the like.

Figure 20A:
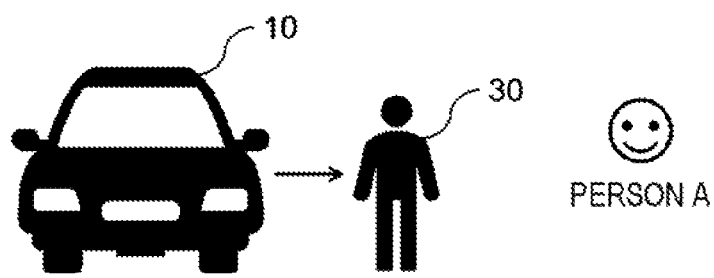
FIGS. 20A to 20C are diagrams for each illustrating a positional relation between a vehicle and a person in a case of vehicle theft.

As illustrated in FIG. 20, in a case of vehicle theft, an owner 30 of a stationary vehicle 10 first comes out of the vehicle 10 (in FIG. 20A). The detection unit 102 detects a person coming out of the vehicle 10 and acquires and temporarily stores a facial image of the person A (the owner of the vehicle 10) coming out of the vehicle 10.

Figure 20B:
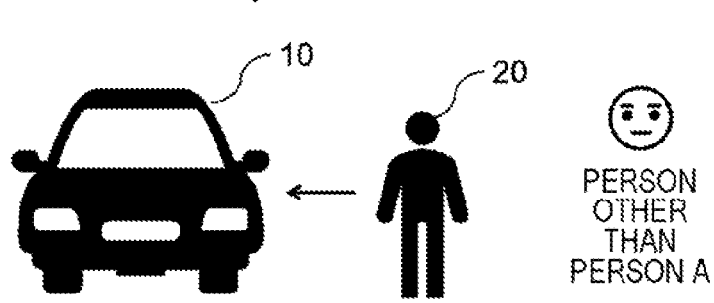
Figure 20C:
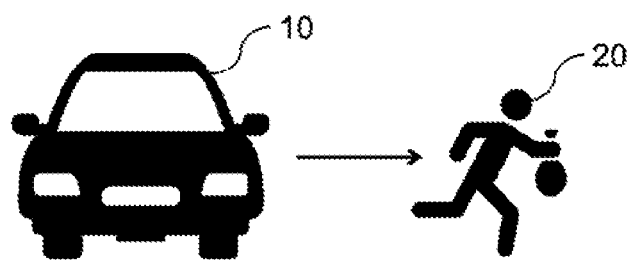

Further continuing the surveillance, the detection unit 102 detects a person 20 approaching the vehicle 10 (in FIG. 20B). At this time, the detection unit 102 acquires a facial image of the person 20. Then, the detection unit 102 may transmit the facial image of the person A acquired earlier and the facial image of the person 20 acquired later to the image processing apparatus 200 and cause the image processing apparatus 200 to check whether the two are the same person. The selection unit 128 selects a type of information to be output, by using the check result. When the two are not the same person, it is determined to be the vehicle theft (in FIG. 20C). When the two are the same person, it is determined to be the owner.

Further, in a case of a facial image not being able to be captured, the person 20 approaching the vehicle 10 in FIG. 20B may be determined to commit vehicle theft when the person 20 comes out of the vehicle 10 immediately (after a predetermined time) after once getting into the vehicle 10.

Figure 21:
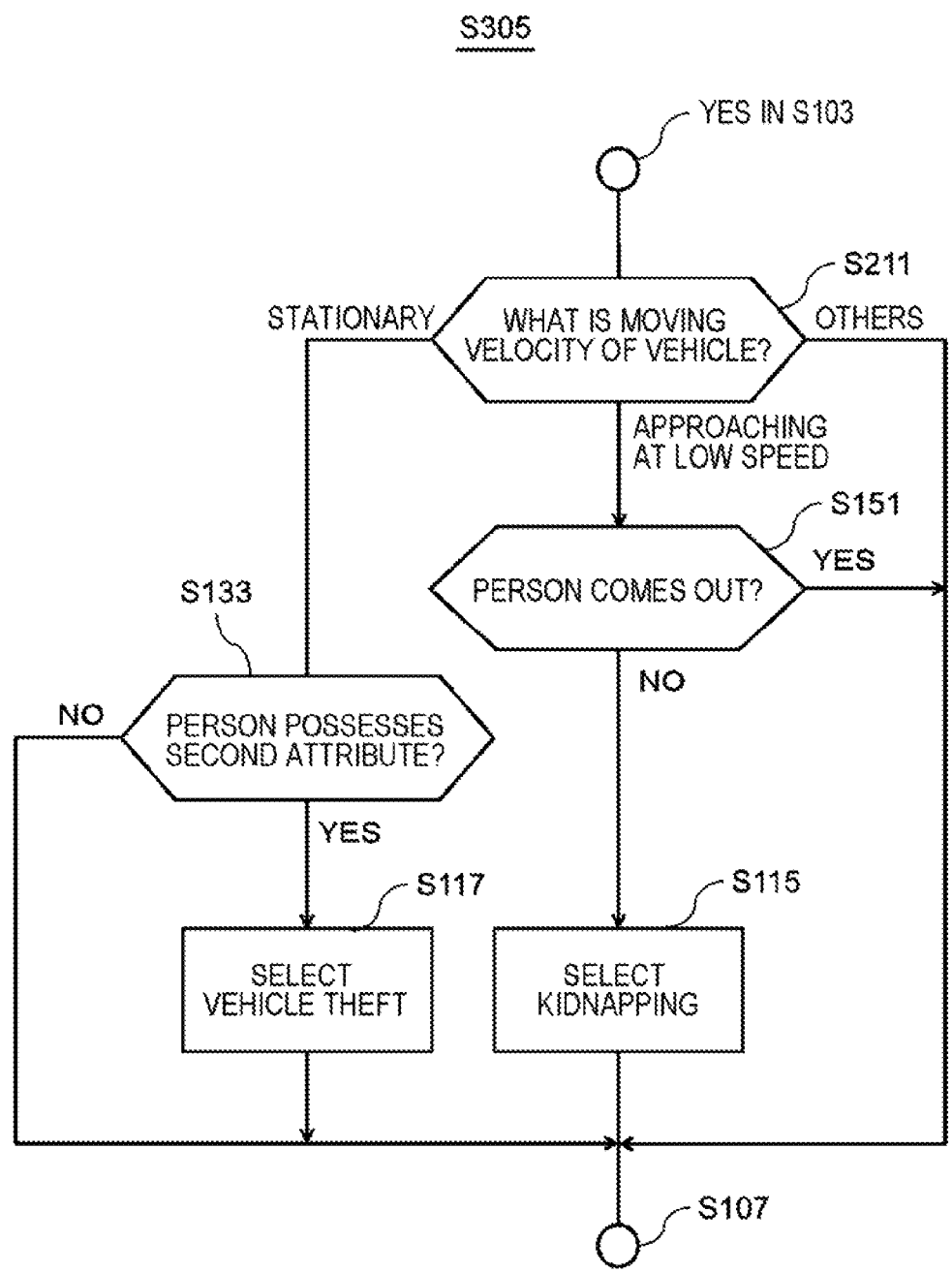
FIG. 21 is a flowchart illustrating an example of operation of the surveillance system.

Furthermore, a procedure other than the example of detecting entry and exit of a person into and from a stationary vehicle 10 and using the result thereof as described in FIG. 19 according to the fifth example embodiment may be considered. FIG. 21 is a flowchart illustrating an example of operation of the surveillance system 1. The flowchart in FIG. 21 includes Step S151 in place of Step S131 in the flowchart in FIG. 14. In this example, when the detection unit 102 determines that the vehicle 10 is approaching the person 20 at a low speed in Step S211, the processing advances to Step S151, and whether a person comes out of the vehicle 10 is determined. When the detection unit 102 does not detect a person coming out (NO in Step S151), the possibility of kidnapping is high, and therefore the processing advances to Step S115. When the detection unit 102 detects a person coming out (YES in Step S151), the vehicle 10 is determined to be merely stopping, and therefore the processing returns to Step S107 in FIG. 12. The remaining processing is the same as that in FIG. 14, and therefore description thereof is not repeated.

While the present invention has been described with reference to example embodiments (and examples) thereof, the present invention is not limited to the aforementioned example embodiments (and examples). Various changes and modifications that may be understood by a person skilled in the art may be made to the configurations and details of the present invention without departing from the scope of the present invention.

Note that when information about a user is acquired and/or used in the present invention, the acquisition and/or use is assumed to be performed legally.

Examples of reference embodiments are added as supplementary notes below.

1. A surveillance apparatus including:
    a detection unit that processes an image in which an area around a road is captured and detects that a relative distance between a person and a vehicle included in the image is in a state of being equal to or less than a reference value; and
    an output unit that selects a type of information to be output, by using an attribute of the person detected to be in the state, and outputting the selected type of information.
2. The surveillance apparatus according to 1., wherein
    the output unit selects the type of information to be output, by further using moving velocity of the vehicle detected to be in the state.
3. A surveillance apparatus including:
    a detection unit that processes an image in which an area around a road is captured and detects that a relative distance between a person and a vehicle included in the image is in a state of being equal to or less than a reference value; and
    an output unit that selects a type of information to be output, by using moving velocity of the vehicle detected to be in the state, and outputs the selected type of information.
4. The surveillance apparatus according to any one of 1. to 3., wherein
    the output unit selects the type of information to be output, further depending on whether the person detected to be in the state takes an independent action.

5. The surveillance apparatus according to any one of 1. to 4., wherein
   the detection unit detects that the vehicle detected to be in the state is determined to be in a stationary state, and that entry and exit of a person are performed after the vehicle becomes stationary, and
   the output unit selects the type of information to be output by further using a detection result made by the detection unit.

6. The surveillance apparatus according to any one of 1. to 5., wherein
   the detection unit performs the processing by using an image from a specific camera out of a plurality of cameras each capturing an image of the area around the road.

7. A surveillance system including:
   a plurality of cameras each capturing an image of an area around a road; and
   a surveillance apparatus surveilling images captured by a plurality of cameras, wherein
   the surveillance apparatus includes:
      a detection unit that processes an image in which an area around a road is captured and detects that a relative distance between a person and a vehicle included in the image is in a state of being equal to or less than a reference value; and
      an output unit that selects a type of information to be output, by using an attribute of the person detected to be in the state, and outputs the selected type of information.

8. The surveillance system according to 7., wherein
   the output unit in the surveillance apparatus selects the type of information to be output, by further using moving velocity of the vehicle detected to be in the state.

9. A surveillance system including:
   a plurality of cameras each capturing an image of an area around a road; and
   a surveillance apparatus surveilling images captured by a plurality of cameras, wherein
   the surveillance apparatus includes:
      a detection unit that processes an image in which an area around a road is captured and detects that a relative distance between a person and a vehicle included in the image is in a state of being equal to or less than a reference value; and
      an output unit that selects a type of information to be output, by using moving velocity of the vehicle detected to be in the state, and outputs the selected type of information.

10. The surveillance system according to any one of 7. to 9., wherein
    the output unit in the surveillance apparatus selects the type of information to be output, further depending on whether the person detected to be in the state takes an independent action.

11. The surveillance system according to any one of 7. to 10., wherein,
    the detection unit in the surveillance apparatus detects that the vehicle detected to be in the state is determined to be in a stationary state, and that entry and exit of a person are performed after the vehicle becomes stationary, and
    the output unit in the surveillance apparatus selects the type of information to be output, by further using a detection result made by the detection unit.

12. The surveillance system according to any one of 7. to 11., wherein
    the detection unit in the surveillance apparatus performs the processing by using an image from a specific camera out of a plurality of cameras each capturing an image of the area around the road.

13. A surveillance method including, by a surveillance apparatus:
    processing an image in which an area around a road is captured and detecting that a relative distance between a person and a vehicle included in the image is in a state of being equal to or less than a reference value; and
    selecting a type of information to be output, by using an attribute of the person detected to be in the state, and outputting the selected type of information.

14. The surveillance method according to 13., further including, by the surveillance apparatus,
    selecting the type of information to be output, by further using moving velocity of the vehicle detected to be in the state.

15. A surveillance method including, by a surveillance apparatus:
    processing an image in which an area around a road is captured and detecting that a relative distance between a person and a vehicle included in the image is in a state of being equal to or less than a reference value; and
    selecting a type of information to be output, by using moving velocity of the vehicle detected to be in the state, and outputting the selected type of information.

16. The surveillance method according to any one of 13. to 15., further including, by the surveillance apparatus,
    selecting the type of information to be output, further depending on whether the person detected to be in the state takes an independent action.

17. The surveillance method according to any one of 13. to 16., further including, by the surveillance apparatus:
    detecting that the vehicle detected to be in the state is in a stationary state, and that entry and exit of a person are performed after the vehicle becomes stationary; and
    selecting the type of information to be output, by further using the detection result.

18. The surveillance method according to any one of 13. to 17., further including, by the surveillance apparatus,
    performing the processing by using an image from a specific camera out of a plurality of cameras each capturing an image of the area around the road.

19. A program for causing a computer to execute:
    a procedure for processing an image in which an area around a road is captured and detecting that a relative distance between a person and a vehicle included in the image is in a state of being equal to or less than a reference value; and
    a procedure for selecting a type of information to be output, by using an attribute of the person detected to be in the state, and outputting the selected type of information.

20. The program according to 19., further causing a computer to execute
    a procedure for selecting the type of information to be output, by further using moving velocity of the vehicle detected to be in the state.

21. A program for causing a computer to execute:
    a procedure for processing an image in which an area around a road is captured and detecting that a relative distance between a person and a vehicle included in the image is in a state of being equal to or less than a reference value; and a procedure for selecting a type of information to be output, by using moving velocity of the vehicle detected to be in the state, and outputting the selected type of information.

22. The program according to any one of 19. to 21., further causing a computer to execute
a procedure for selecting the type of information to be output, further depending on whether the person detected to be in the state takes an independent action.

23. The program according to any one of 19. to 22., further causing a computer to execute:
a procedure for detecting that the vehicle detected to be in the state is determined to be in a stationary state, and that entry and exit of a person are performed after the vehicle becomes stationary; and
a procedure for selecting the type of information to be output, by further using a detection result made by the procedure for detection.

24. The program according to any one of 19. to 23., further causing a computer to execute
a procedure for performing the processing by using an image from a specific camera out of a plurality of cameras each capturing an image of the area around the road.

More examples of reference embodiments are added as supplementary notes below.

25. A surveillance apparatus including:
a detection unit that processes an image in which an area around a road is captured and detects that a relative distance between a person and a vehicle included in the image is in a state of being equal to or less than a reference value; and
an output unit that outputs a type of information to be output, the type of information being selected by using an attribute of the person detected to be in the state.

26. The surveillance apparatus according to 25., further including:
an acquisition unit that acquires the image in which the area around the road is captured, the image being generated by a camera;
an object determination unit that recognizes and determining a person and a vehicle by performing image processing on the image acquired by the acquisition unit;
a position determination unit that, by performing the image processing, determines positions of the person and the vehicle determined by the object determination unit;
an attribute determination unit that, by performing the image processing, determines an attribute of the person determined by the position determination unit; and
a selection unit that, when the detection unit detects a person and a vehicle in the state, selects the type of information to be output, by using the determined attribute of the detected person, wherein
the output unit outputs information of the type selected by the selection unit.

27. The surveillance apparatus according to 25. or 26., further including:
an acquisition unit that acquires the image in which the area around the road is captured, the image being generated by a camera;
an object determination unit that recognizes and determines a person and a vehicle by performing image processing on the image acquired by the acquisition unit;
a position determination unit that, by performing the image processing, determines positions of the person and the vehicle determined by the object determination unit;
a moving velocity estimation unit that estimates moving velocity of the vehicle determined by the position determination unit, from a change in a position of the vehicle; and
a selection unit that selects the type of information to be output, by using the moving velocity of the vehicle estimated by the moving velocity estimation unit, wherein
the output unit outputs information of the type selected by the selection unit.

28. The surveillance apparatus according to any one of 25. to 27., further including:
an acquisition unit that acquires the image in which the area around the road is captured, the image being generated by a camera;
an object determination unit that recognizes and determines a person and a vehicle by performing image processing on the image acquired by the acquisition unit;
a position determination unit that, by performing the image processing, determines positions of the person and the vehicle determined by the object determination unit;
a headcount determination unit that determines the number of the persons determined by the object determination unit and determines whether the determined person takes an independent action; and
a selection unit that selects a type of the information to be output based on a determination result made by the headcount determination unit, wherein
the output unit outputs information of the type selected by the selection unit.

29. The surveillance apparatus according to 27. or 28. citing 27., wherein,
when determining that the vehicle detected to be in the state is in a stationary state from the moving velocity estimated by the moving velocity estimation unit, the detection unit further detects whether entry and exit of a person into and from the vehicle are performed,
the selection unit selects a type of the information to be output, by further using a detection result of the entry and exit of the person made by the detection unit, and
the output unit outputs information of the type selected by the selection unit.

30. The surveillance apparatus according to any one of 25. To 29., wherein
the detection unit performs the processing by using an image from a specific camera out of a plurality of cameras each capturing an image of the area around the road.

31. A surveillance system including:
a plurality of cameras each capturing an image of an area around a road; and
a surveillance apparatus surveilling images captured by a plurality of cameras, wherein
the surveillance apparatus includes:
a detection unit that processes an image in which an area around a road is captured and detects that a relative distance between a person and a vehicle included in the image is in a state of being equal to or less than a reference value; and an output unit that outputs a type of information to be output, the type of information being selected by using an attribute of the person detected to be in the state.

32. The surveillance system according to 31., wherein the surveillance apparatus further includes:
   an acquisition unit that acquires the image in which the area around the road is captured, the image being generated by a camera;
   an object determination unit that recognizes and detects a person and a vehicle by performing image processing on the image acquired by the acquisition unit;
   a position determination unit that, by performing the image processing, determines positions of the person and the vehicle determined by the object determination unit;
   an attribute determination unit that, by performing the image processing, determines an attribute of the person determined by the position determination unit; and
   a selection unit that, when the detection unit detects a person and a vehicle in the state, selects the type of information to be output, by using the determined attribute of the detected person, wherein
   the output unit in the surveillance apparatus outputs information of the type selected by the selection unit.

33. The surveillance system according to 31. or 32., wherein
the surveillance apparatus further includes:
   an acquisition unit that acquires the image in which the area around the road is captured, the image being generated by a camera;
   an object determination unit that recognizes and determines a person and a vehicle by performing image processing on the image acquired by the acquisition unit;
   a position determination unit that, by performing the image processing, determines positions of the person and the vehicle determined by the object determination unit;
   a moving velocity estimation unit that estimates moving velocity of the vehicle determined by the position determination unit, from a change in a position of the vehicle; and
   a selection unit that selects the type of information to be output, by using the moving velocity of the vehicle estimated by the moving velocity estimation unit, wherein
   the output unit in the surveillance apparatus outputs information of the type selected by the selection unit.

34. The surveillance system according to any one of 31. to 33., wherein the surveillance apparatus further including:
   an acquisition unit that acquires the image in which the area around the road is captured, the image being generated by a camera;
   an object determination unit that recognizes and determines a person and a vehicle by performing image processing on the image acquired by the acquisition unit;
   a position determination unit that, by performing the image processing, determines positions of the person and the vehicle determined by the object determination unit;
   a headcount determination unit that determines the number of the persons determined by the object determination unit and determines whether the determined person takes an independent action; and
   a selection unit that selects a type of the information to be output based on a determination result made by the headcount determination unit, wherein
   the output unit in the surveillance apparatus outputs information of the type selected by the selection unit.

35. The surveillance system according to 33. or 34. citing 33., wherein,
   when determining that the vehicle detected to be in the state is in a stationary state from the moving velocity estimated by the moving velocity estimation unit, the detection unit in the surveillance apparatus further detects whether entry and exit of a person into and from the vehicle are performed,
   the selection unit in the surveillance apparatus selects a type of the information to be output, by further using a detection result of the entry and exit of the person by the detection unit, and
   the output unit in the surveillance apparatus outputs information of the type selected by the selection unit.

36. The surveillance system according to any one of 31. to 35., wherein
   the detection unit in the surveillance apparatus performs the processing by using an image from a specific camera out of a plurality of cameras each capturing an image of the area around the road.

37. A surveillance method including, by a surveillance apparatus:
   processing an image in which an area around a road is captured and detecting that a relative distance between a person and a vehicle included in the image is in a state of being equal to or less than a reference value; and
   outputting a type of information to be output, the type of information being selected by using an attribute of the person detected to be in the state.

38. The surveillance method according to 37., further including, by the surveillance apparatus:
   acquiring the image in which the area around the road is captured, the image being generated by a camera;
   recognizing and determining a person and a vehicle by performing image processing on the acquired image;
   determining positions of the determined person and the determined vehicle by performing the image processing;
   determining an attribute of the determined person by performing the image processing;
   when detecting a person and a vehicle in the state, selecting the type of information to be output, by using the determined attribute of the detected person; and
   outputting information of the selected type.

39. The surveillance method according to 37. or 38., further including, by the surveillance apparatus:
   acquiring the image in which the area around the road is captured, the image being generated by a camera;
   recognizing and determining a person and a vehicle by performing image processing on the acquired image;
   determining positions of the determined person and the determined vehicle by performing the image processing;
   estimating moving velocity of the determined vehicle from a change in a position of the vehicle;
   selecting the type of information to be output, by using the moving velocity of the estimated vehicle; and
   outputting information of the selected type.

40. The surveillance method according to any one of 37. to 39., further including, by the surveillance apparatus:
   acquiring the image in which the area around the road is captured, the image being generated by a camera;

recognizing and determining a person and a vehicle by performing image processing on the acquired image;

determining positions of the determined person and the determined vehicle by performing the image processing;

determining the number of the determined persons and determining whether the determined person takes an independent action;

selecting a type of the information to be output selected based on a result of the determination; and outputting information of the selected type.

41. The surveillance method according to 39. or 40. citing 39., further including, by the surveillance apparatus:

when determining that the vehicle detected to be in the state is in a stationary state from the estimated moving velocity, further detecting whether entry and exit of a person into and from the vehicle are performed;

selecting a type of the information to be output, by further using a detection result of the entry and exit of the person; and outputting information of the selected type.

42. The surveillance method according to any one of 37. to 41., further including, by the surveillance apparatus:

performing the processing by using an image from a specific camera out of a plurality of cameras each capturing an image of the area around the road.

43. A program for causing a computer to execute:

a procedure for processing an image in which an area around a road is captured and detecting that a relative distance between a person and a vehicle included in the image is in a state of being equal to or less than a reference value; and a procedure for outputting a type of information to be output, the type of information being selected by using an attribute of the person detected to be in the state.

44. The program according to 43., further causing a computer to execute:

a procedure for acquiring the image in which the area around the road is captured, the image being generated by a camera;

a procedure for recognizing and determining a person and a vehicle by performing image processing on the image acquired in the procedure for acquisition;

a procedure for, by performing the image processing, determining positions of the person and the vehicle determined in the procedure for determining a person and a vehicle;

a procedure for, by performing the image processing, determining an attribute of the person determined in the procedure for determining positions;

a procedure for, when a person and a vehicle in the state are detected in the procedure for detection, selecting the type of information to be output, by using the determined attribute of the detected person; and a procedure for outputting information of the type selected in the procedure for selection.

45. The program according to 43. or 44., further causing a computer to execute:

a procedure for acquiring the image in which the area around the road is captured, the image being generated by a camera;

a procedure for recognizing and determining a person and a vehicle by performing image processing on the image acquired in the procedure for acquisition;

a procedure for, by performing the image processing, determining positions of the person and the vehicle determined in the procedure for determining a person and a vehicle;

a procedure for estimating moving velocity of the vehicle determined in the procedure for determining positions, from a change in a position of the vehicle;

a procedure for selecting the type of information to be output, by using the moving velocity of the vehicle estimated in the procedure for estimating moving velocity; and a procedure for outputting information of the type selected in the procedure for selection.

46. The program according to any one of 43. to 45., further causing a computer to execute:

a procedure for acquiring the image in which the area around the road is captured, the image being generated by a camera;

a procedure for recognizing and determining a person and a vehicle by performing image processing on the image acquired in the procedure for acquisition;

a procedure for, by performing the image processing, determining positions of the person and the vehicle determined in the procedure for determining a person and a vehicle;

a procedure for determining the number of the persons determined in the procedure for determining a person and a vehicle and determining whether the determined person takes an independent action;

a procedure for selecting a type of the information to be output based on a result of the determination; and a procedure for outputting information of the type selected in the procedure for selection.

47. The program according to 45. or 46. citing 45., further causing a computer to execute a procedure for, when the vehicle detected to be in the state is determined to be in a stationary state from the moving velocity estimated in the procedure for estimating moving velocity, further detecting whether entry and exit of a person into and from the vehicle are performed, a procedure for selecting a type of the information to be output, by further using a detection result of the entry and exit of the person, and a procedure for outputting information of the selected type.

48. The program according to any one of 43. to 47., further causing a computer to execute a procedure for performing the processing by using an image from a specific camera out of a plurality of cameras each capturing an image of the area around the road.

REFERENCE SIGNS LIST

1 Surveillance system
3 Communication network
5 Surveillance camera
10 Vehicle
20 Person
30 Owner
100 Surveillance apparatus
102 Detection unit
104 Output unit
120 Acquisition unit
122 Object determination unit
124 Position determination unit 126 Attribute determination unit
128 Selection unit
130 Moving velocity estimation unit
132 Head count determination unit
200 Image processing apparatus
220 Server
300 Storage apparatus
1000 Computer
1010 Bus
1020 Processor
1030 Memory
1040 Storage device
1050 Input-output interface
1060 Network interface

What is claimed is:

1. A surveillance apparatus comprising:
at least one memory storing instructions; and
at least one processor configured to execute the instructions to:
process a plurality of time-series images in which an area around a road is captured and detect positions of a feature part of each of person and vehicle in the plurality of time-series images, and by using the detected positions of the feature part of each of the person and the vehicle in the plurality of time-series images, determine that a relative distance between the person and the vehicle in the plurality of time-series images is equal to or less than a reference value;
obtain an attribute of the person based on the relative distance between the person and the vehicle being equal to or less than the reference value;
determine, using feature values stored in a storage, whether the attribute of the person is a first attribute or a second attribute, the first attribute related to information indicating whether the person is likely to be a victim of a crime, and a second attribute related to information indicating whether the person is likely to be a perpetrator of a criminal act;
select one of a first type of warning information indicating a possibility of occurrence of kidnapping based on the attribute of the person being the first attribute, or a second type of warning information indicating a possibility of occurrence of vehicle theft based on the attribute of the person being the second attribute; and
output the first type of warning information or the second type of warning information based on the selection.

2. The surveillance apparatus according to claim 1, wherein the at least one processor configured to execute the instructions to:
acquire the plurality of time-series images in which the area around the road is captured, the plurality of time-series images being generated by a camera;
recognize and determine the person and the vehicle by performing image processing on the plurality of time-series images.

3. The surveillance apparatus according to claim 1, wherein the at least one processor configured to execute the instructions to:
acquire the plurality of time-series images in which the area around the road is captured, the plurality of time-series images being generated by a camera;
recognize and determine the person and the vehicle by performing image processing on the plurality of time-series images;
estimate moving velocity of the determined vehicle, from a change in a position of the vehicle; and
select the first type of warning information or the second type of warning information, by using the estimated moving velocity of the determined vehicle.

4. The surveillance apparatus according to claim 1, wherein the at least one processor configured to execute the instructions to:
acquire the plurality of time-series images in which the area around the road is captured, the plurality of time-series images being generated by a camera;
recognize and determine the person and the vehicle by performing image processing on the plurality of time-series images, the determining the person comprising determining one or more persons;
determine at least one of a number of the determined one or more persons or whether the determined one or more persons take an independent action;
select the first type of warning information or the second type of warning information based on at least one of the number of the determined one or more persons or whether the determined one or more persons take the independent action.

5. The surveillance apparatus according to claim 3, wherein the at least one processor configured to execute the instructions to:
based on determining that the vehicle is in a stationary state using the estimated moving velocity, detecting whether entry and exit of a person into and from the vehicle occurs within a predetermined time from the determining that the vehicle is in the stationary state;
select the first type of warning information based on no detection of the entry of the person into and from the vehicle and based on the attribute of the person being the first attribute; and
select the second type of warning information based on detecting the entry of the person into and from the vehicle and based on the attribute of the person being the second attribute.

6. The surveillance apparatus according to claim 1, wherein the at least one processor configured to execute the instructions to
perform the processing by using the plurality of time-series images from a specific camera out of a plurality of cameras each capturing an image of the area around the road.

7. A surveillance method by a surveillance apparatus, the surveillance method comprising:
processing a plurality of time-series images in which an area around a road is captured and detecting positions of a feature part of each of person and vehicle in the plurality of time-series images, and by using the detected positions of the feature part of each of the person and the vehicle in the plurality of time-series images, determining that a relative distance between the person and the vehicle in the plurality of time-series images is equal to or less than a reference value;
obtaining an attribute of the person based on the relative distance between the person and the vehicle being equal to or less than the reference value;
determining, using feature values stored in a storage, the attribute of the person selected from a set comprising a first attribute and a second attribute, the first attribute related to information indicating whether the person is likely to be a victim of a crime, and a second attribute related to information indicating whether the person is likely to be a perpetrator of a criminal act;

selecting and outputting a type of warning information from a set comprising a first type of warning information corresponding to the first attribute and a second type of warning information corresponding to the second attribute, the first type of warning information indicating a possibility of occurrence of kidnapping and the second type of warning information indicating a possibility of occurrence of vehicle theft.

8. The surveillance method according to claim 7, further comprising:

acquiring the plurality of time-series images in which the area around the road is captured, the plurality of time-series images being generated by a camera;

recognizing and determining the person and the vehicle by performing image processing on the plurality of time-series images.

9. The surveillance method according to claim 7, further comprising, by the surveillance apparatus:

acquiring the plurality of time-series images in which the area around the road is captured, the plurality of time-series images being generated by a camera;

recognizing and determining the person and the vehicle by performing image processing on the plurality of time-series images;

estimating moving velocity of the determined vehicle from a change in a position of the vehicle; and selecting the first type of warning information or the second type of warning information, by using the estimate moving velocity of the determined vehicle.

10. The surveillance method according to claim 7, further comprising, by the surveillance apparatus:

acquiring the plurality of time-series images in which the area around the road is captured, the plurality of time-series images being generated by a camera;

recognizing and determining the person and the vehicle by performing image processing on the plurality of time-series images, the determining the person comprising determining one or more persons;

determining at least one of a number of the determined one or more persons or whether the determined one or more persons take an independent action;

selecting the first type of warning information or the second type of warning information based on at least one of the number of the determined one or more persons or whether the determined one or more persons take the independent action.

11. The surveillance method according to claim 9, further comprising, by the surveillance apparatus:

based on determining that the vehicle is in a stationary state using the estimated moving velocity, detecting whether entry and exit of a person into and from the vehicle occurs within a predetermined time from the determining that the vehicle is in the stationary state;

selecting the first type of warning information based on no detection of the entry of the person into and from the vehicle and based on the attribute of the person being the first attribute; and selecting the second type of warning information based on detecting the entry of the person into and from the vehicle and based on the attribute of the person being the second attribute.

12. The surveillance method according to claim 7, further comprising:

performing the processing by using the plurality of time-series images from a specific camera out of a plurality of cameras each capturing an image of the area around the road.

13. A non-transitory computer-readable storage medium storing a program for causing a computer to execute:

a procedure for processing a plurality of time-series images in which an area around a road is captured and detecting positions of a feature part of each of person and vehicle in the plurality of time-series images, and by using the detected positions of the feature part of each of the person and the vehicle in the plurality of time-series images, determining that a relative distance between the person and the vehicle in the plurality of time-series images is equal to or less than a reference value;

a procedure for obtaining an attribute of the person based on the relative distance between the person and the vehicle being equal to or less than the reference value;

a procedure for determining, using feature values stored in a storage, whether the attribute of the person is a first attribute or a second attribute, the first attribute related to information indicating whether the person is likely to be a victim of a crime, and a second attribute related to information indicating whether the person is likely to be a perpetrator of a criminal act;

a procedure for selecting one of a first type of warning information indicating a possibility of occurrence of kidnapping based on the attribute of the person being the first attribute, or a second type of warning information indicating a possibility of occurrence of vehicle theft based on the attribute of the person being the second attribute; and a procedure for outputting the first type of warning information or the second type of warning information based on the selection.

14. The non-transitory computer-readable storage medium program according to claim 13, further the program causing the computer to execute:

a procedure for acquiring the plurality of time-series images in which the area around the road is captured, the plurality of time-series images being generated by a camera;

a procedure for recognizing and determining the person and the vehicle by performing image processing on the plurality of time-series images.

15. The non-transitory computer-readable storage medium according to claim 13, wherein the program further causing the computer to execute:

a procedure for acquiring the plurality of time-series images in which the area around the road is captured, the plurality of time-series images being generated by a camera;

a procedure for recognizing and determining the person and the vehicle by performing image processing on the plurality of time-series images;

a procedure for estimating moving velocity of the determined vehicle from a change in a position of the vehicle; and a procedure for selecting the first type of warning information or the second type of warning information, by using the estimated moving velocity of determined the vehicle.

16. The non-transitory computer-readable storage medium according to claim 13, wherein the program further causing the computer to execute:

a procedure for acquiring the plurality of time-series images in which the area around the road is captured, the plurality of time-series images being generated by a camera;

a procedure for recognizing and determining the person and the vehicle by performing image processing on the plurality of time-series images, the determining the person comprising determining one or more persons;

a procedure for determining at least one of a number of the determined one or more persons or whether the determined one or more persons take an independent action;

a procedure for selecting the first type of warning information or the second type of warning information based on at least one of the number of the determined one or more persons or whether the determined one or more persons take the independent action.

17. The non-transitory computer-readable storage medium according to claim 15, wherein the program further causing the computer to execute a procedure for, based on the vehicle is determined to be in a stationary state using the estimated moving velocity, detecting whether entry and exit of a person into and from the vehicle occurs within a predetermined time from the determining that the vehicle is in the stationary state, a procedure of selecting the first type of warning information based on no detection of the entry of the person into and from the vehicle and based on the attribute of the person being the first attribute; and a procedure of selecting the second type of warning information based on detecting the entry of the person into and from the vehicle and based on the attribute of the person being the second attribute.

18. The non-transitory computer-readable storage medium according to claim 13, wherein the program further causing the computer to execute a procedure for performing the processing by using the plurality of time-series images from a specific camera out of a plurality of cameras each capturing an image of the area around the road.

* * * * *